(12) United States Patent
Hayashi et al.

(10) Patent No.: US 10,954,073 B2
(45) Date of Patent: Mar. 23, 2021

(54) POSITION DETECTING DEVICE AND LINEAR CONVEYOR DEVICE PROVIDED WITH SAME

(71) Applicant: YAMAHA HATSUDOKI KABUSHIKI KAISHA, Iwata (JP)

(72) Inventors: Yoshinori Hayashi, Shizuoka (JP); Satoshi Urata, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 196 days.

(21) Appl. No.: 16/324,069

(22) PCT Filed: Sep. 26, 2016

(86) PCT No.: PCT/JP2016/078212
§ 371 (c)(1),
(2) Date: Feb. 7, 2019

(87) PCT Pub. No.: WO2018/055755
PCT Pub. Date: Mar. 29, 2018

(65) Prior Publication Data
US 2019/0193942 A1  Jun. 27, 2019

(51) Int. Cl.
*B65G 25/04* (2006.01)
*G01D 5/244* (2006.01)
(Continued)

(52) U.S. Cl.
CPC ............. *B65G 25/04* (2013.01); *G01B 21/00* (2013.01); *G01D 5/24438* (2013.01);
(Continued)

(58) Field of Classification Search
CPC .................................................. H02K 11/21
See application file for complete search history.

(56) References Cited

U.S. PATENT DOCUMENTS

| 4,800,818 A | 1/1989 | Kawaguchi et al. |
| 2011/0025137 A1 | 2/2011 | Sakai |

(Continued)

FOREIGN PATENT DOCUMENTS

| CN | 101981790 A | 2/2011 |
| CN | 103907274 A | 7/2014 |

(Continued)

OTHER PUBLICATIONS

International Search Report issued in PCT/JP2016/078212; dated Dec. 13, 2016.

(Continued)

*Primary Examiner* — Thomas Randazzo
(74) *Attorney, Agent, or Firm* — Studebaker & Brackett PC

(57) ABSTRACT

The linear conveyor device includes a position detecting device including a scale attached to a slider, and a sensor structural body including a sensor and a driver. The driver is provided with a first and a second signal processing units, and a signal comparison processing unit. The first signal processing unit performs predetermined first interpolation processing on an output signal from a first sensor, generates and outputs first positional data. The second signal processing unit performs predetermined second interpolation processing on an output signal from a second sensor, generates second positional data, and outputs the second positional data. The signal comparison processing unit recognizes the first positional data as positional information of the slider, generates identification information unique to the slider, and outputs the identification information, where the identification information corresponds to a difference between the first positional data and the second positional data.

12 Claims, 14 Drawing Sheets

(51) Int. Cl.
- *H02K 11/21* (2016.01)
- *H02K 41/03* (2006.01)
- *H02K 11/215* (2016.01)
- *G01B 21/00* (2006.01)
- *B65G 54/02* (2006.01)

(52) U.S. Cl.
CPC ........... *H02K 11/21* (2016.01); *H02K 11/215* (2016.01); *H02K 41/031* (2013.01); *B65G 54/02* (2013.01)

(56) References Cited

U.S. PATENT DOCUMENTS

| | | | | |
|---|---|---|---|---|
| 2014/0257554 | A1* | 9/2014 | Takagi | H02K 11/21 700/229 |
| 2014/0292112 | A1* | 10/2014 | Mukai | H02K 11/215 310/12.19 |
| 2014/0320058 | A1 | 10/2014 | Takagi | |

FOREIGN PATENT DOCUMENTS

| | | | |
|---|---|---|---|
| JP | S62-107606 A | 5/1987 | |
| JP | H05-260613 A | 10/1993 | |
| JP | 2003-244929 A | 8/2003 | |
| JP | 2003244929 A * | 8/2003 | ............ H02K 41/03 |
| JP | 5753060 B2 | 7/2015 | |
| WO | 2013/069203 A1 | 5/2013 | |

OTHER PUBLICATIONS

An Office Action issued by the State Intellectual Property Office of the Peoples Republic of China dated Jun. 23, 2020, which corresponds to Chinese Patent Application No. 201680089067.4 and is related to U.S. Appl. No. 16/324,069 with English language translation.

* cited by examiner

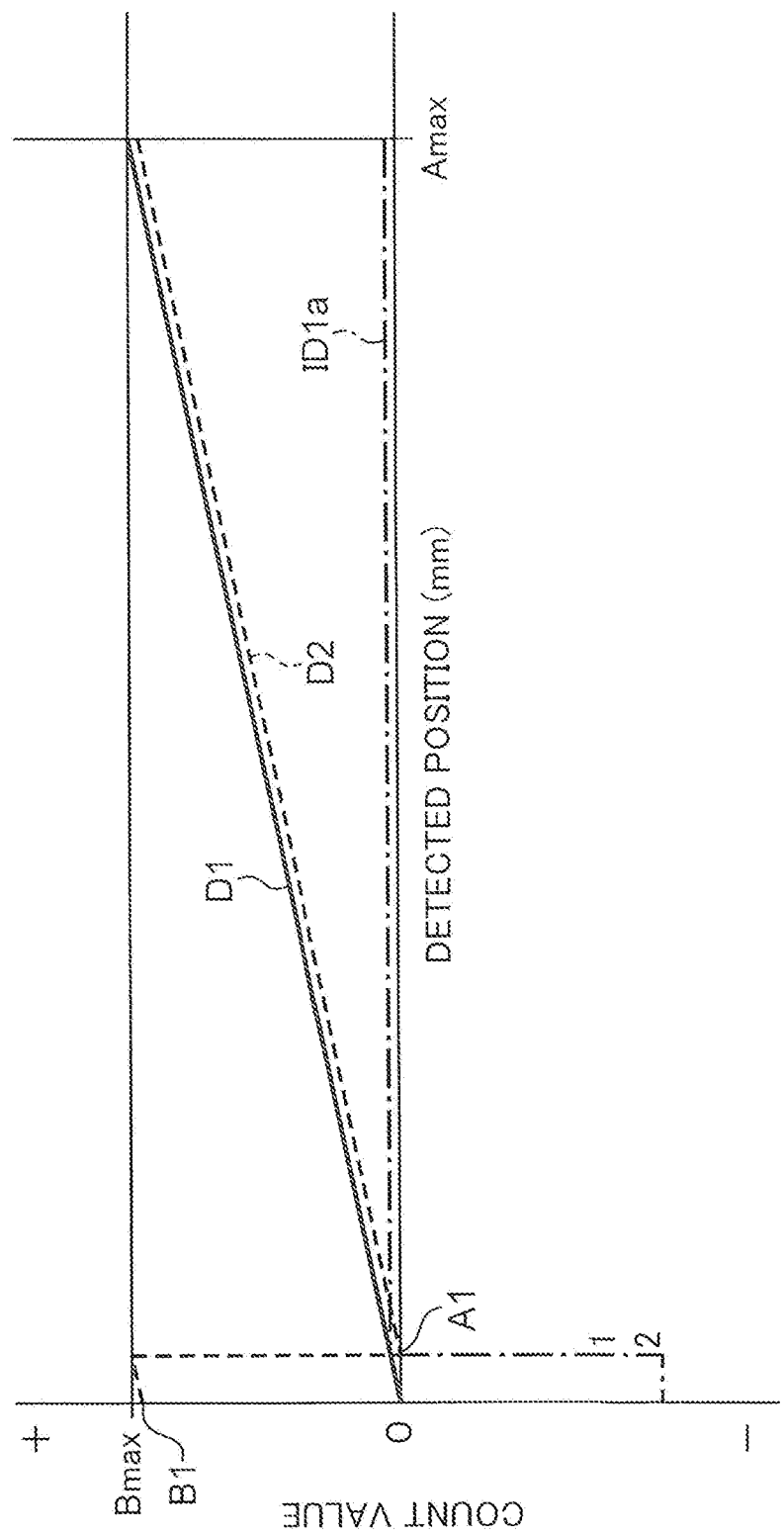

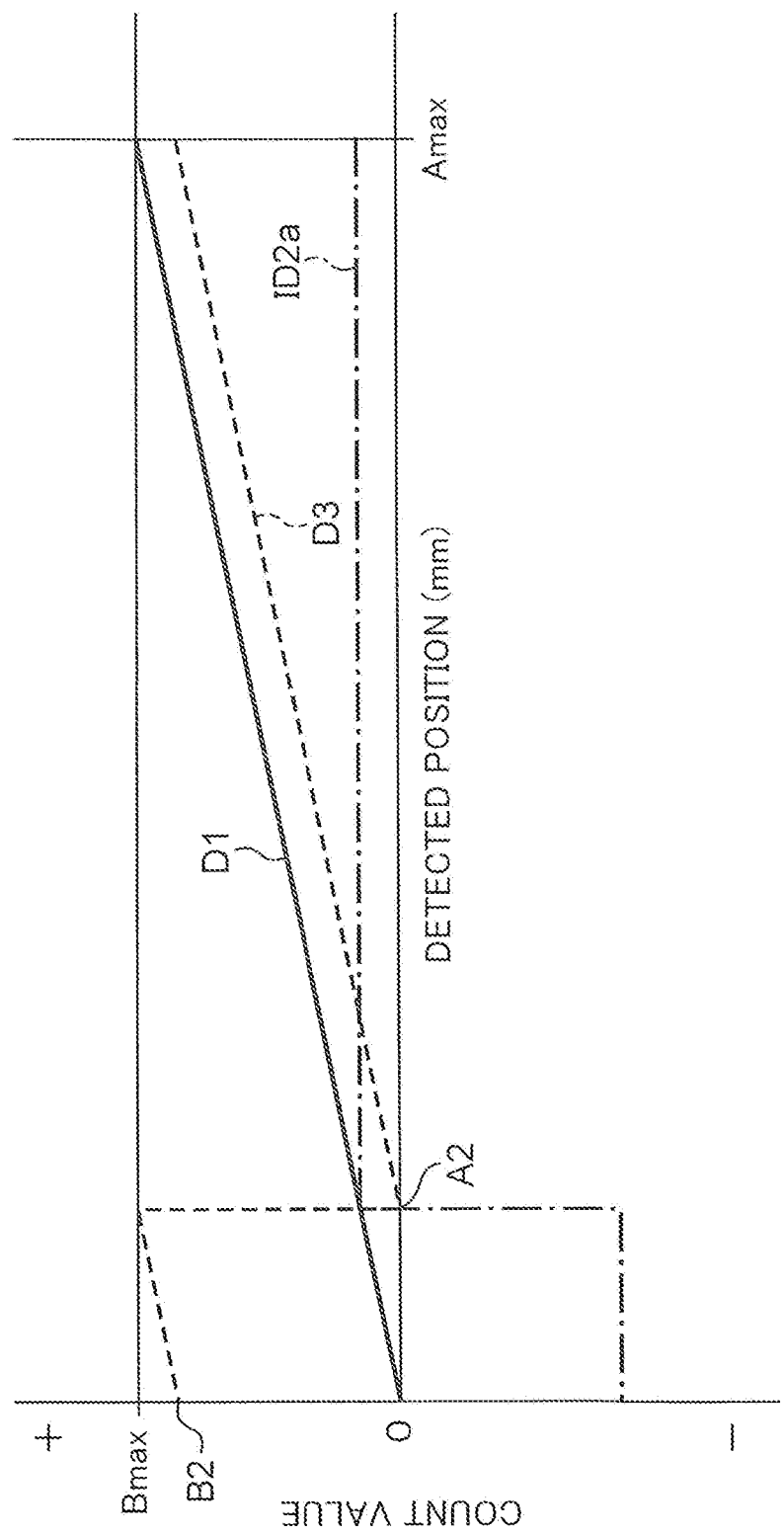

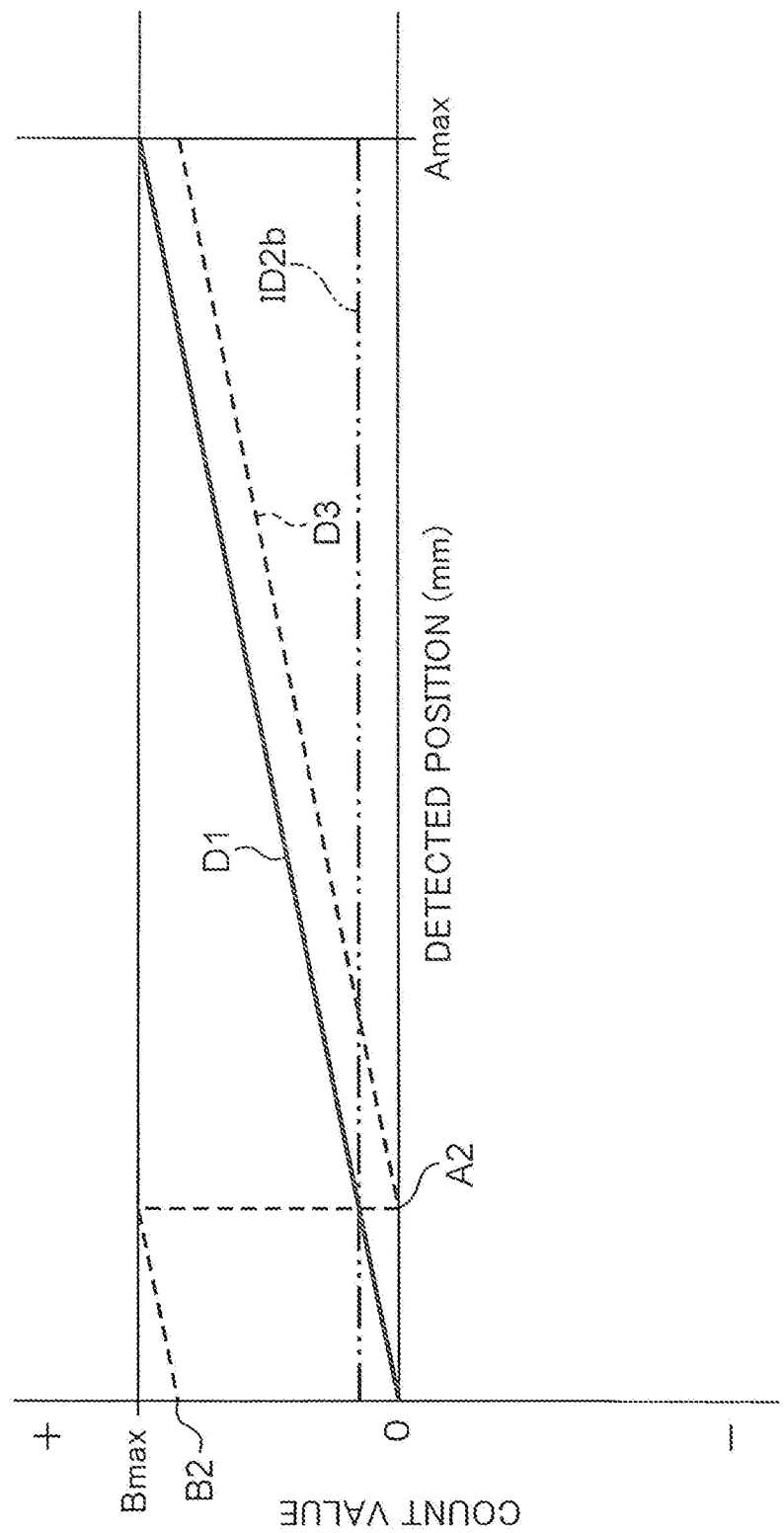

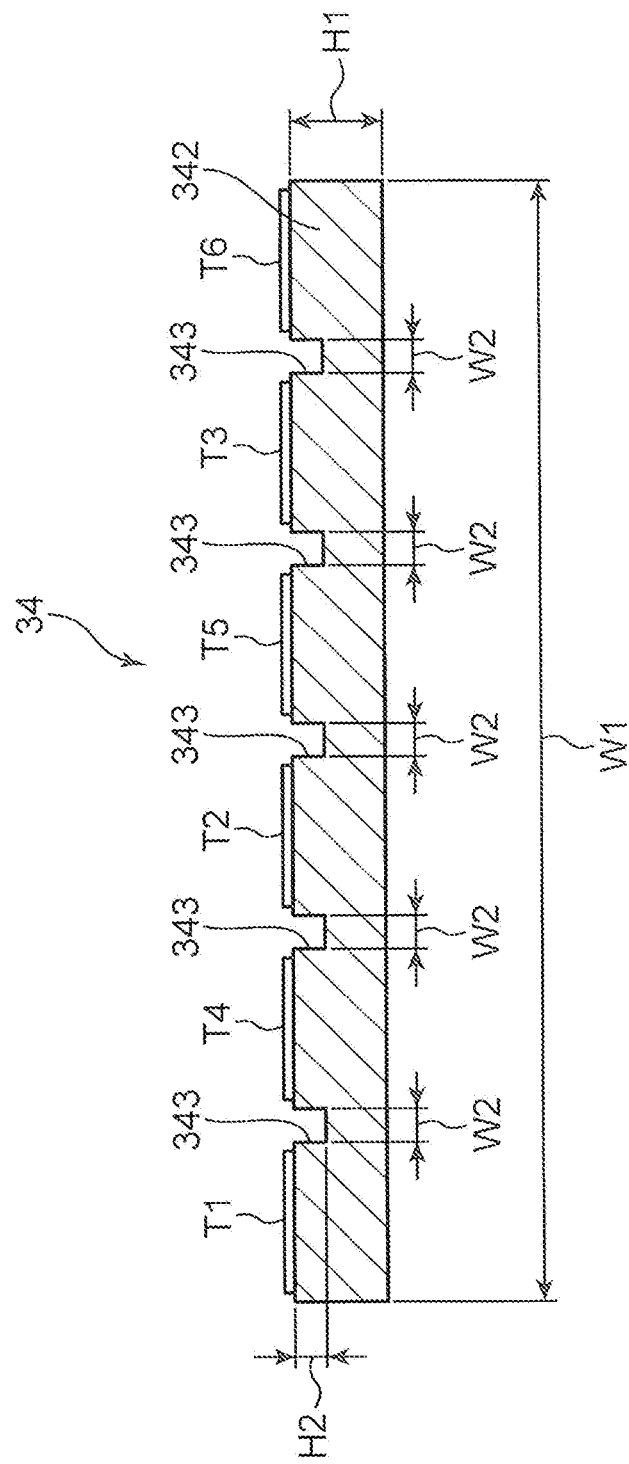

ABSTRACT# POSITION DETECTING DEVICE AND LINEAR CONVEYOR DEVICE PROVIDED WITH SAME

CROSS-REFERENCE TO RELATED APPLICATION

This application is a National Stage of International Patent Application No. PCT/JP2016/078212, filed Sep. 26, 2016, the entire content of which is incorporated herein by reference.

BACKGROUND

Technical Field

The present disclosure relates to a position detecting device that detects a position of the slider, and a linear conveyor device including the position detecting device.

Background Art

There has been known a linear conveyor device which uses a linear motor as a drive source, and moves a slider along a guide rail in a predetermined moving direction as described, for example, in JP 5753060 B1. In the case of a movable magnet type linear motor, the guide rail is assembled to a base frame on which a linear motor stator is mounted, and a linear motor mover is mounted on the slider. The linear motor stator is an electromagnet disposed parallel to the guide rail, and the linear motor mover is a permanent magnet. The linear motor is driven with the supply of electricity to the linear motor stator (electromagnet) and a propulsion force is given to the slider.

The linear conveyor device includes a recording medium, such as an RF tag, provided on the slider to record identification information unique to the slider, and a reader-and-writer that reads the identification information recorded in the recording medium. The linear conveyor device identifies the slider to be moved based on the identification information. Moreover, the linear conveyor device includes a scale attached to the slider, and a position detecting device including a sensor mounted on the base frame. The position detecting device is such that the sensor detects the displacement relative to the slider, and the position of the slider is identified based on the detection data obtained by the sensor. The linear conveyor device performs a drive control of the linear motor by a power supply control of the linear motor stator based on the position of the slider.

SUMMARY

As described above, a conventional linear conveyor device that generates information used for the drive control of a linear motor needs to have a position detecting device that identifies the position of a slider, and a mechanism, provided separately from the position detecting device, for identifying the slider to be moved. The conventional linear conveyor device thus has a complex configuration.

The present disclosure is made in view of such a problem. The present disclosure provides a position detecting device that identifies a slider to be moved and the position of the slider, and a linear conveyor device including the position detecting device.

A position detecting device according to one aspect of the present disclosure is a position detecting device that detects a position of a slider that moves along a predetermined moving direction, the position detecting device including: a scale that is attached to the slider and includes a first track and a second track adjacent to each other along a direction perpendicular to the moving direction, the first track being composed of scale marks lined along the moving direction at a first interval, the second track being composed of scale marks lined along the moving direction at a second interval; a processing unit that detects the first track to generates first positional data corresponding to the first interval and detects the second track to generate second positional data corresponding to the second interval; and an information processing unit that recognizes the first positional data as positional information of the slider, generates identification information unique to the slider, and outputs the identification information, the identification information corresponding to a difference between the first positional data and the second positional data.

A linear conveyor device according to another aspect of the present disclosure includes: a slider that has a linear motor mover and is configured to be movable in a predetermined moving direction; a linear motor stator that faces the linear motor mover of the slider and forms a linear motor in cooperation with the linear motor mover; and the position detecting device described above.

Objects, technical features, and advantages of the present disclosure will become more apparent from the following detailed description and accompanying drawings.

BRIEF DESCRIPTION OF THE DRAWINGS

FIG. 7A is a diagram for describing interpolation processing performed by first and second signal processing units in the driver and identification information generating processing performed by a signal comparison processing unit in the driver;

FIG. 8A is a diagram for describing interpolation processing performed by first and third signal processing units in the driver and identification information generating processing performed by the signal comparison processing unit in the driver;

FIG. 8B is a diagram for describing interpolation processing performed by the first and third signal processing units in the driver and identification information generating processing performed by the signal comparison processing unit in the driver;

FIG. 9B is a sectional view of the scale shown in FIG. 9A;

DETAILED DESCRIPTION

Hereinafter, a position detecting device and a linear conveyor device according to an embodiment of the present disclosure are described with reference to drawings. The directional relationship is described hereinafter using XYZ orthogonal coordinate axes. An X direction corresponds to a lateral direction (+X being a right side and −X being a left side), a Y direction corresponds to a longitudinal direction (+Y being a front side and −Y being a rear side), and a Z direction corresponds to a vertical direction (+Z being an upper side and −Z being a lower side).

[Overall Configuration of Linear Conveyor Device]

Figure 1:
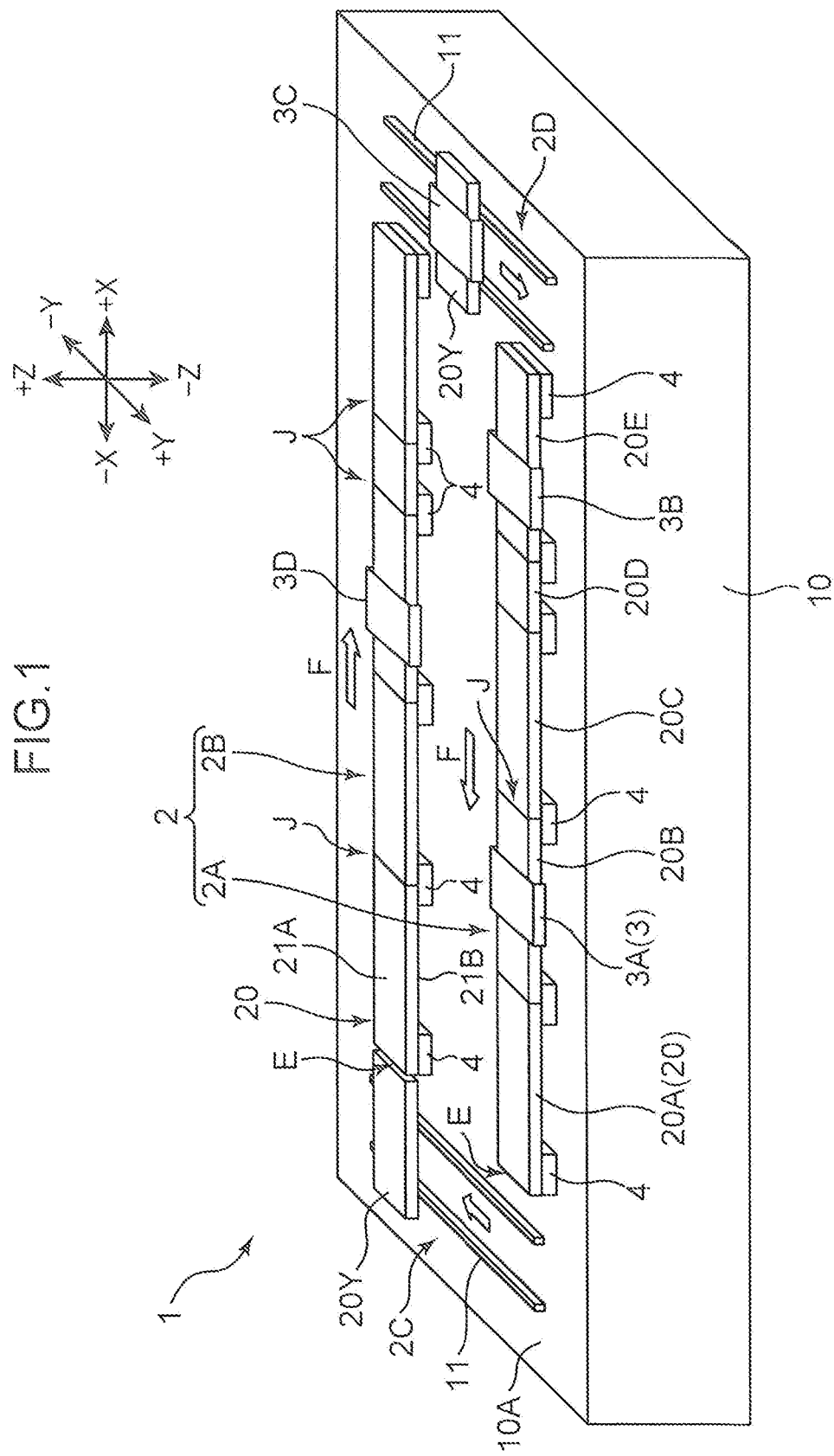
FIG. 1 is a perspective view schematically showing an overall configuration of a linear conveyor device according to an embodiment of the present disclosure.

FIG. 1 is a perspective view schematically showing the overall configuration of a linear conveyor device 1 according to one embodiment of the present disclosure. The linear conveyor device 1 includes: a pair of straight-line conveyance parts 2 (a first straight-line conveyance part 2A and a second straight-line conveyance part 2B) which is mounted on a platform 10 and extends in the X direction; a first direction changing part 2C and a second direction changing part 2D which are positioned on a −X side end portion and on a +X side end portion of the straight-line conveyance parts 2, respectively; a slider 3 which moves along the straight-line conveyance parts 2; and base members 4 which support the straight-line conveyance parts 2 on the platform 10. The straight-line conveyance parts 2 are formed of the first straight-line conveyance part 2A disposed on the platform 10 on a +Y side and the second straight-line conveyance part 2B disposed on the platform 10 on a −Y side parallel to the first straight-line conveyance part 2A. The first and second direction changing parts 2C, 2D connect the straight-line conveyance parts 2A, 2B to each other on a −X side end portion and a +X side end portion thereof.

The first and second straight-line conveyance parts 2A. 2B are conveyance parts for moving the slider 3 in the X direction. The first and second direction changing parts 2C, 2D are conveyance parts for moving the slider 3 in the Y direction, and transfer the slider 3 between the first and second straight-line conveyance parts 2A, 2B. That is, the first and second direction changing parts 2C, 2D change a conveying direction of the slider 3. The first and second straight-line conveyance parts 2A, 2B are fixed-side units of the linear motor, and the slider 3 is a movable-side unit of the linear motor.

The first and second straight-line conveyance parts 2A, 2B are each formed by linearly connecting a plurality of modules 20 having a function of guiding the slider 3. The module 20 is a fixed-side unit block of the linear motor. The module 20 (a base frame 21 described later) has an upper surface 21A and a lower surface 21B which faces the platform 10. The module 20 is supported by the base member 4 in a state where the lower surface 21B separates from an upper surface 10A of the platform 10.

FIG. 1 shows an example where the first straight-line conveyance part 2A is formed of modules 20A, 20B, 20C, 20D, and 20E which are sequentially connected to each other from a −X direction to a +X direction. In FIG. 1, an example is exemplified where the module 20D has a length shorter than those of the other modules. The second straight-line conveyance part 2B also has substantially the same structure. In this manner, a moving path length of the slider 3 in the X direction can be set as desired by changing the number of modules 20 to be connected to each other or the combination of the modules 20 having different lengths.

The first and second direction changing parts 2C, 2D each include slide rails 11 and a changing module 20Y. The slide rails 11 are installed on the upper surface 10A of the platform 10 such that the slide rails 11 extend in the Y direction. The changing module 20Y is fitted on the slide rail 11 such that the changing module 20Y is movable in the Y direction along the slide rail 11. The changing module 20Y is movable between a terminal end portion E of the first straight-line conveyance part 2A and a terminal end portion E of the second straight-line conveyance part 2B, and is positioned and stopped with respect to the terminal end portions E by a drive mechanism not shown in the drawing.

The slider 3 is movable in a circulating manner on a circulatory moving path formed of the first and second straight-line conveyance parts 2A, 2B and the first and second direction changing parts 2C, 2D, the circulatory moving path being provided on the platform 10. FIG. 1 shows an example where four sliders 3A, 3B, 3C, and 3D are arranged on the circulatory moving path, and the sliders circulate in a slider moving direction F in a clockwise manner. The slider 3 moves from a +X side to a −X side of the first straight-line conveyance part 2A (also including a case where the slider 3 is moved in a reverse direction toward the +X side temporarily), and the slider 3 is transferred from the −X terminal end portion E to the changing module 20Y of the first direction changing part 2C. In a state where the slider 3 is mounted on the changing module 20Y, the changing module 20Y is moved in a −Y direction from the first straight-line conveyance part 2A to the second straight-line conveyance part 2B. Next, the slider 3 is transferred from the −X terminal end portion E to the second straight-line conveyance part 2B, and is moved toward the +X side. Then, the slider 3 is transferred to the changing module 20Y of the second direction changing part 2D, is moved in the +Y direction, and is transferred to the first straight-line conveyance part 2A again.

Although not shown in the drawing, along the circulatory moving path of the slider 3, various robots are disposed which perform the transfer of a workpiece such as a printed circuit board, an operation of mounting electronic parts and the like on the printed circuit board, for example. An upper surface of the slider 3 forms a placing part on which the workpiece or the like is placed. The slider 3 is intermittently moved on the first and second straight-line conveyance parts 2A, 2B such that the slider 3 is stopped at an operation position of a robot which performs one step, and is moved toward an operation position of a robot which performs a next step after an operation in the above-mentioned one step is finished.

The base member 4 is disposed between the platform 10 and lower surfaces 21B of the modules 20 at a connecting portion J between the modules 20, and positions and supports a pair of modules 20 to be connected to each other. Further, the base member 4 is also disposed at the terminal end portions E of the first and second straight-line conveyance parts 2A, 2B. The base member 4 is formed of a metal block made of metal having excellent rigidity such as aluminum.

[Overall Configuration of Module]

Figure 2:
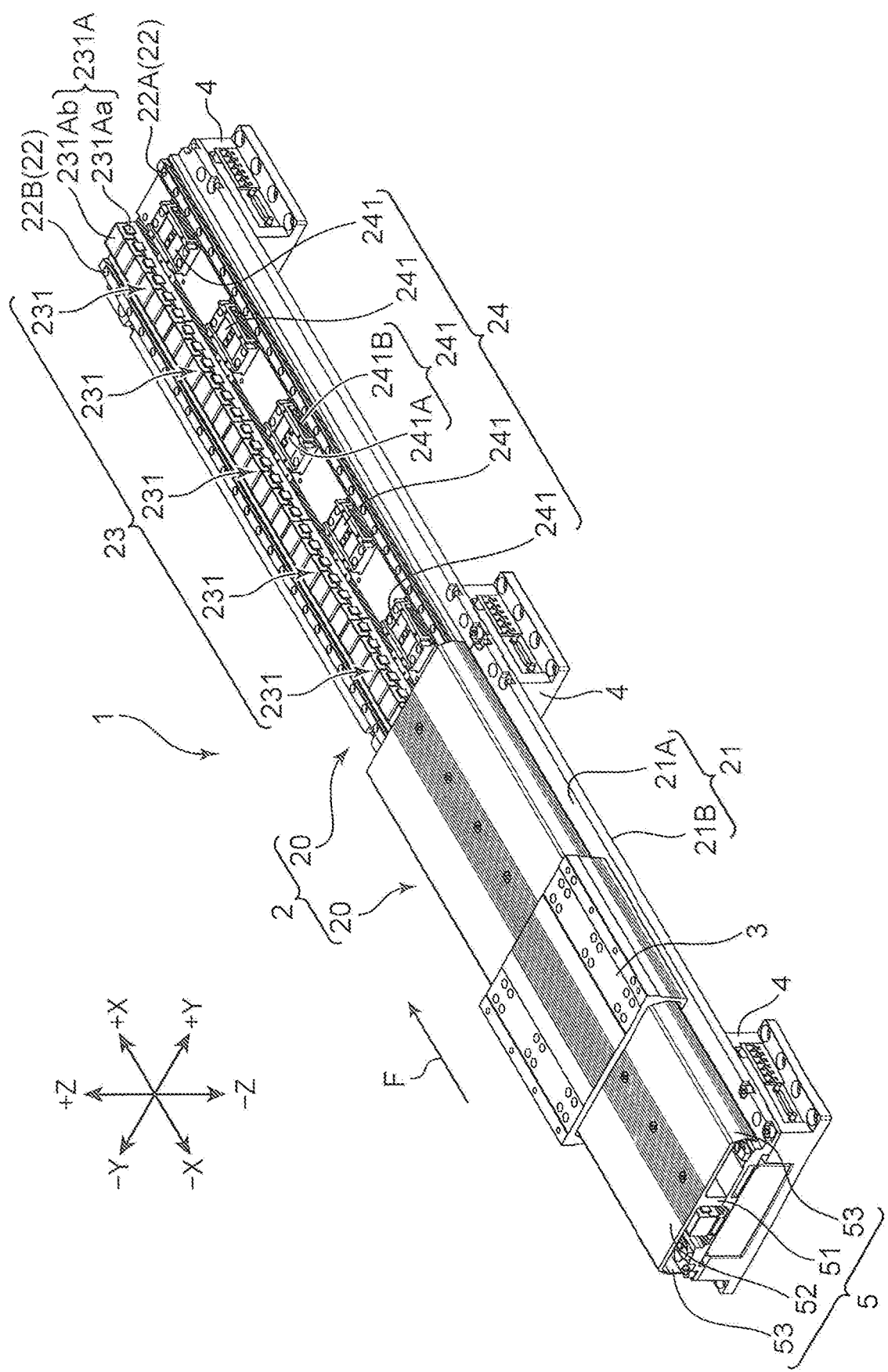
FIG. 2 is a perspective view of a connected body of two modules which form the linear conveyor device.

A specific example of the module 20 is described. FIG. 2 is a perspective view of a connected body of two modules 20 which form a part of the straight-line conveyance part 2. FIG. 2 shows a state where a cover member 5 of one of two modules 20 is removed. Each module 20 includes a base frame 21, guide rails 22 (first guide rail 22A and second guide rail 22B), a stator unit 23, and a motor drive unit 24. In this embodiment, the cover member 5 is mounted on each of the modules 20.

The straight-line conveyance part 2 is formed of the connected body of the modules 20 which each include the cover member 5. The slider 3 is movably mounted on the straight-line conveyance part 2 in an extending direction of the straight-line conveyance part 2 in a mode where the slider 3 is fitted on the cover member 5. The modules 20 are supported by the base members 4 on the platform 10 while being positioned at the connecting portions J of the modules 20 and the terminal end portions E of the straight-line conveyance part 2, the platform 10 serving as a mounting base of the linear conveyor device 1.

The base frame 21 of the module 20 is a frame made of metal such as aluminum, and is a flat plate-like member which forms the upper surface 21A and the lower surface 21B of the above-mentioned module 20. The upper surface 21A is a surface on which the guide rail 22, the stator unit 23, and the motor drive unit 24 are mounted. The lower surface 21B is a surface which faces the upper surface 10A of the platform 10 with a predetermined distance therebetween, and is in contact with the base members 4.

The guide rail 22 is a member which guides the movement of the slider 3. The guide rail 22 is mounted on the upper surface 21A of the base frame 21, and is formed of: a first guide rail 22A disposed on a +Y side; and a second guide rail 22B disposed on a −Y side parallel to the first guide rail 22A. By connecting end portions of the plurality of base frames 21 in the X direction to each other in a butting manner, a pair of unit guide rails 22A. 22B of the respective base frames 21 are connected to each other and hence, the guide rails 22A, 22B extending in a limitless manner can be formed.

The stator unit 23 is mounted on the upper surface 21A of the base frame 21 between the first guide rail 22A and the second guide rail 22B. In this embodiment, the stator unit 23 is disposed along the second guide rail 22B on a −Y side between the first guide rail 22A and the second guide rail 22B. The stator unit 23 is a structural body formed by connecting a plurality of linear motor stators 231 along the X direction. Each linear motor stator 231 is formed by arranging a plurality of electromagnets 231A in a row in the X direction, wherein each electromagnet 231A is formed by winding a coil 231Ab around a core 231Aa. Both end portions, in +Y side and −Y side, of the core 231Aa each serves as a magnetic pole. The cores 231Aa are aligned along X direction at a constant interval with each core 231Aa extending in Y direction. Each linear motor stator 231 faces a linear motor mover 32 attached to the slider 3 and described later, and forms a linear motor in cooperation with the linear motor mover 32.

The motor drive unit 24 is mounted on the upper surface 21A of the base frame 21 such that the motor drive unit 24 faces the stator unit 23. In this embodiment, the motor drive unit 24 is disposed along the first guide rail 22A on a +Y side between the first guide rail 22A and the second guide rail 22B. With such a configuration, the motor drive unit 24 faces the stator unit 23. The motor drive unit 24 includes a plurality of sensor structural bodies 241 disposed along X direction. Each of the sensor structural bodies 241 corresponds to one of the linear motor stators 231.

A scale 34 attached to the slider 3 and the sensor structural bodies 241 of the motor drive unit 24 constitute a position detecting device according to this embodiment. Details on the sensor structural bodies 241 of the motor drive unit 24 constituting the position detecting device are described later.

The cover member 5 is mounted on the upper surface 21A such that the cover member 5 covers the upper surface 21A of the base frame 21 (straight-line conveyance part 2). The cover member 5 is formed of an extruded molded body made of metal such as aluminum, and includes a support leg 51, a horizontal cover portion 52, and a pair of side surface cover portions 53.

The support leg 51 is a flat plate portion which extends in a vertical direction (Z direction) as viewed in cross section in the Y direction and extends in an elongated manner in the X direction, and is positioned in the vicinity of the center of the cover member 5 in the Y direction. The support leg 51 is fixed to the base frame 21. That is, the support leg 51 is provided on the upper surface 21A of the base frame 21 in an erected manner in a center region in the width direction. The horizontal cover portion 52 extends horizontally from an upper end of the support leg 51 toward the +Y side (one side in the width direction) and toward the −Y side (the other side in the width direction). The pair of side surface cover portions 53 respectively extend downward from end portions of the horizontal cover portion 52 on the +Y side and on the −Y side.

The horizontal cover portion 52 covers the upper surface 21A such that the horizontal cover portion 52 covers and conceals upper portions of the guide rails 22, the stator unit 23, and the motor drive unit 24 that are mounted on the upper surface 21A of the base frame 21. The side surface cover portions 53 cover outer sides of the first and second guide rails 22A, 22B. By mounting the cover member 5 in such a manner, it is possible to prevent the intrusion of contaminant and a foreign material into the upper surface 21A.

[Detail of Slider]

Figure 3:
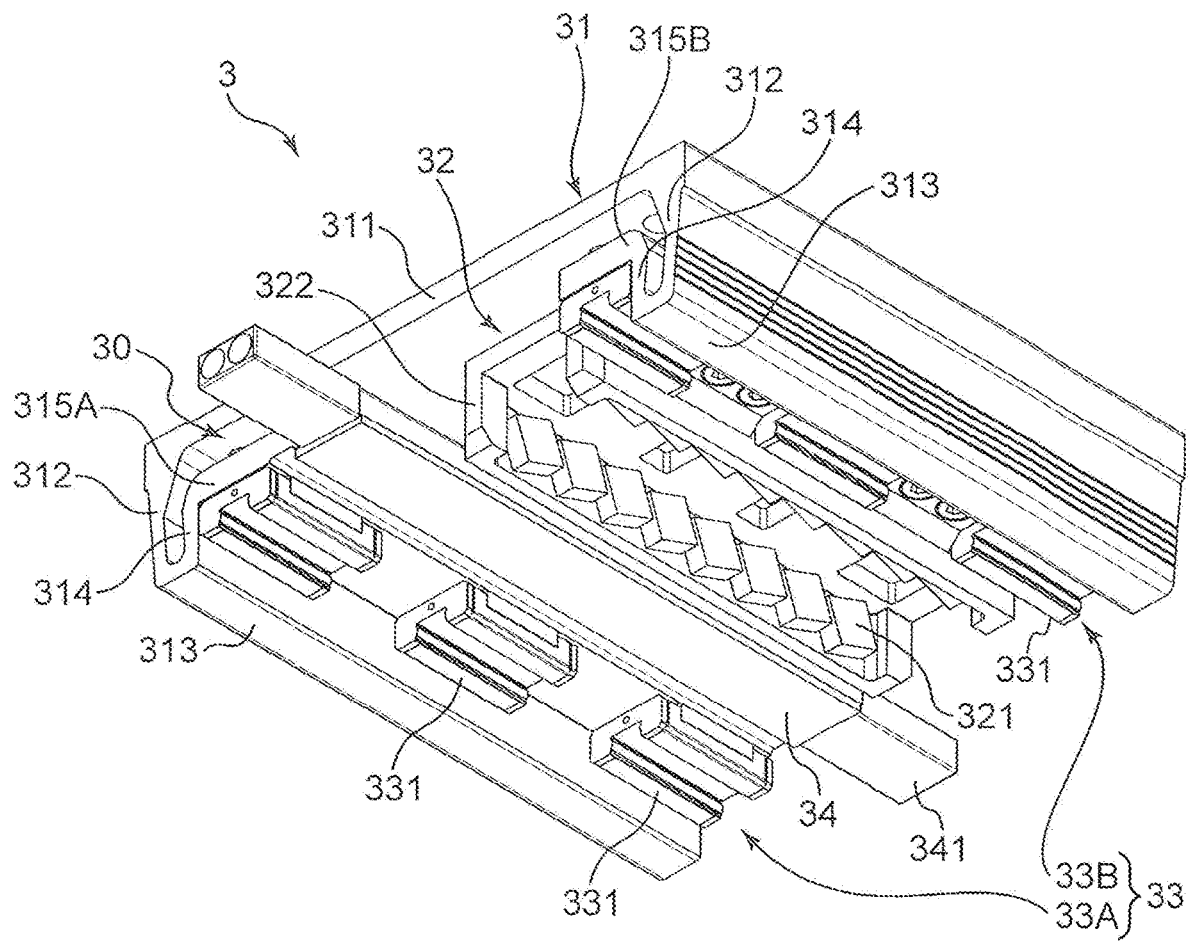
FIG. 3 is a perspective view of a slider which the linear conveyor device includes.

FIG. 3 is a perspective view of the slider 3 which the linear conveyor device 1 includes. The slider 3 includes a slider frame 31, the linear motor mover 32, a pair of guide blocks 33 (first guide block 33A, second guide block 33B), and the scale 34.

The slider frame 31 is a metal block formed of an extruded molded body made of metal such as aluminum, and has an upper surface serving as a placing part on which a workpiece is placed. The slider frame 31 has a fitting portion 30 which can be fitted on the base frame 21 from an end portion of the fitting portion 30 in the X direction, the base frame 21 having the cover member 5. The slider frame 31 includes an upper plate 311, a pair of side plates 312, a pair of bottom plates 313, a pair of inner side plates 314, a first lower plate 315A, and a second lower plate 315B.

The upper plate 311 is formed of a horizontal plate having the approximately same width as that of the base frame 21 in the Y direction and having a predetermined length in the X direction. An upper surface of the upper plate 311 serves as the placing part on which a workpiece is placed. The side plates 312, the bottom plates 313, the inner side plates 314, and the first and second lower plates 315A, 315B have the same length as that of the upper plate 311 in the X direction. The pair of side plates 312 is a pair of vertical plates respectively extending downward from end portions of the upper plate 311 on the +Y side and the −Y side. The pair of bottom plates 313 is a pair of horizontal plates extending from lower ends of the respective side plates 312, extending toward the center of the upper plate 311 in the width direction, and having a short length in the Y direction. The bottom plates 313 are portions of the slider 3 which project downward most.

The pair of inner side plates 314 is a pair of vertical plates respectively extending upward from inner side ends of the respective bottom plates 313. A vertical width of the inner side plate 314 is approximately a half of a vertical width of the side plate 312. The first lower plate 315A extends from upper ends of the inner side plates 314 on the +Y side toward the center of the slider frame 31 in the width direction (−Y direction). The second lower plate 315B extends from the upper end of the inner side plate 314 on the −Y side toward the center of the slider frame 31 in the width direction (+Y direction).

The upper plate 311, the side plates 312, the bottom plates 313, the inner side plates 314, and the first and second lower plates 315A, 315B form a portion having a shape which is fitted in the cover member 5, that is, the fitting portion 30. The fitting portion 30 defines a cavity in which the cover member 5 is received. In a state where the slider 3 is fitted on the module 20 and the cover member 5 is fitted on the fitting portion 30, the upper plate 311 is positioned on an upper side of the horizontal cover portion 52 of the cover member 5. The pair of side plates 312 is respectively positioned outside end portions of the horizontal cover portion 52 on the +Y side and the −Y side. The bottom plates 313 are positioned below lower edges of the side surface cover portions 53, and the inner side plates 314 are positioned on an inner surface side of the side surface cover portions 53. Upper surfaces of the first and second lower plates 315A, 315B face a lower surface of the upper plate 311 and lower surfaces of the first and second lower plates 315A, 315B face the upper surface 21A of the base frame 21.

The linear motor mover 32 includes: a plurality of permanent magnets 321 arranged in the X direction; and a back yoke 322 which holds the permanent magnets 321. The back yoke 322 is a member which holds the permanent magnets 321 and forms a magnetic path. The back yoke 322 has the structure which opens downward, and electromagnets 231A (linear motor stator 231) are disposed between a pair of side plates which form the structure. The plurality of permanent magnets 321 are arranged on the pair of respective side plates of the back yoke 322 (surfaces of the side plates which face the cores 231Aa of the electromagnets 231A) such that an N pole and an S pole appear alternately. The linear motor mover 32 is mounted on the slider frame 31 at a position where the linear motor mover 32 faces the linear motor stator 231 in the vertical direction. The linear motor mover 32 forms the linear motor together with the linear motor stator 231 on a base frame 21 side. In response to a signal from a motor controller not shown in the drawings, electric currents of a U phase, a V phase, and a W phase which have different phases is supplied to the linear motor stator 231 (the coils 231Ab of the electromagnets 231A). With such an operation, a magnetic propulsion force is generated due to an interaction between a magnetic flux generated by the coils 231Ab and a magnetic flux generated by the permanent magnets 321 which the linear motor mover 32 has, and the slider 3 can be moved in a slider moving direction F by the propulsion force.

The first and second guide blocks 33A, 33B are fitted on the first and second guide rails 22A, 22B, and are moved in the X direction while being guided by the first and second guide rails 22A. 22B. The first and second guide blocks 33A. 33B are mounted on a lower surface of the slider frame 31 at positions where the first and second guide blocks 33A, 33B face the first and second guide rails 22A, 22B.

The scale 34 is a magnetic scale attached to the slider frame 31 so as to face the sensor 241A. As described above, the scale 34 attached to the slider 3 and the sensor structural bodies 241, which are described later, of the motor drive unit 24 together constitute a position detecting device according to this embodiment. The slider frame 31 is provided with a stopper 341 that dampen the impact from the colliding slider 3.

[Detail on Position Detecting Device]

The position detecting device according to this embodiment includes a scale 34 attached to the slider 3 and the sensor structural bodies 241 of the motor drive unit 24. The sensor structural body 241 constitutes a processing unit and an information processing unit according to the present disclosure. The sensor structural body 241 detects the scale 34 attached to the slider 3 and generates positional data. Using the positional data, the sensor structural body 241 recognizes the positional information of the slider 3 and generates identification information unique to the slider 3.

Figure 4:
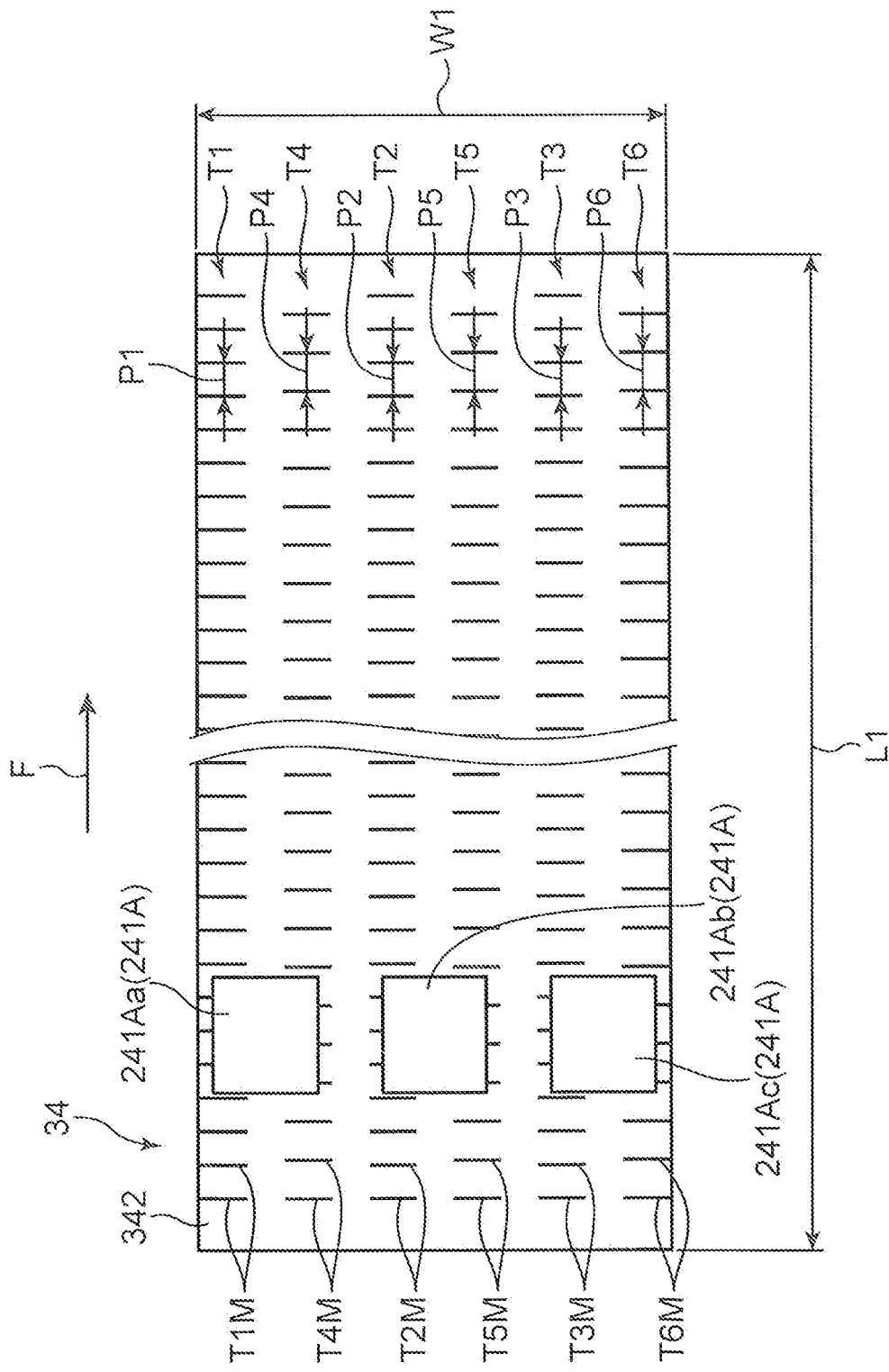
FIG. 4 is a diagram schematically showing configurations of a sensor and a scale.
Figure 5:
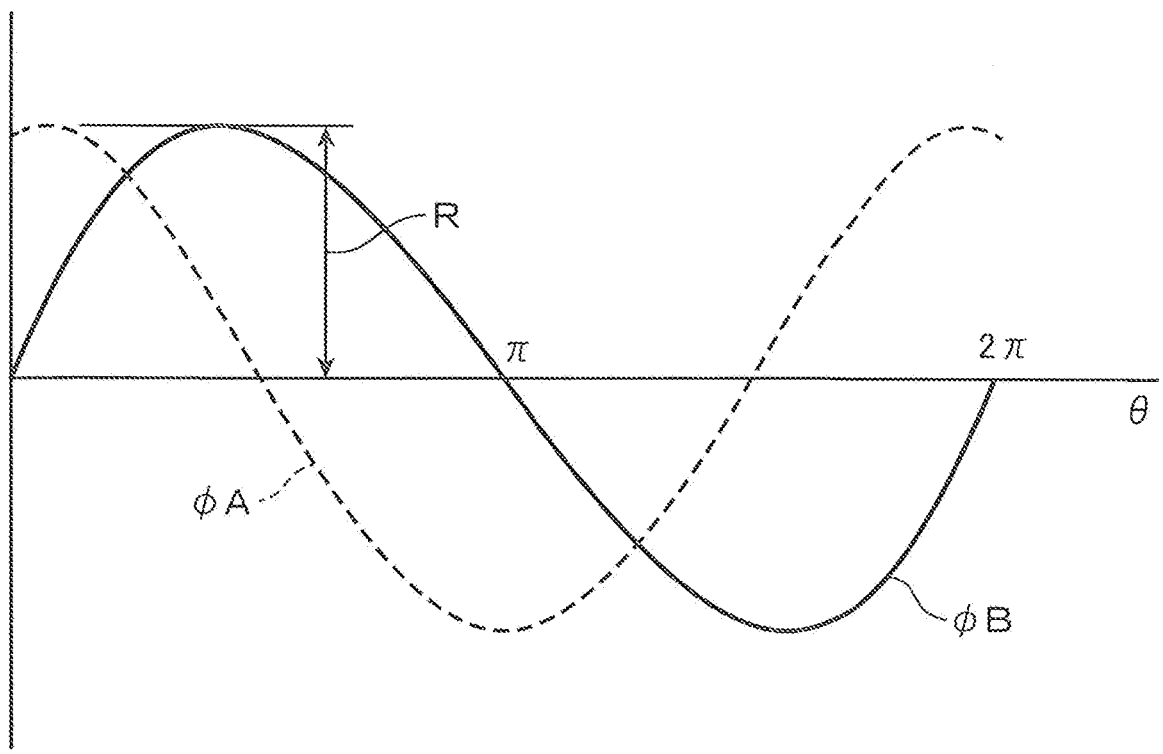
FIG. 5 is a diagram showing an output signal from the sensor.
Figure 6:
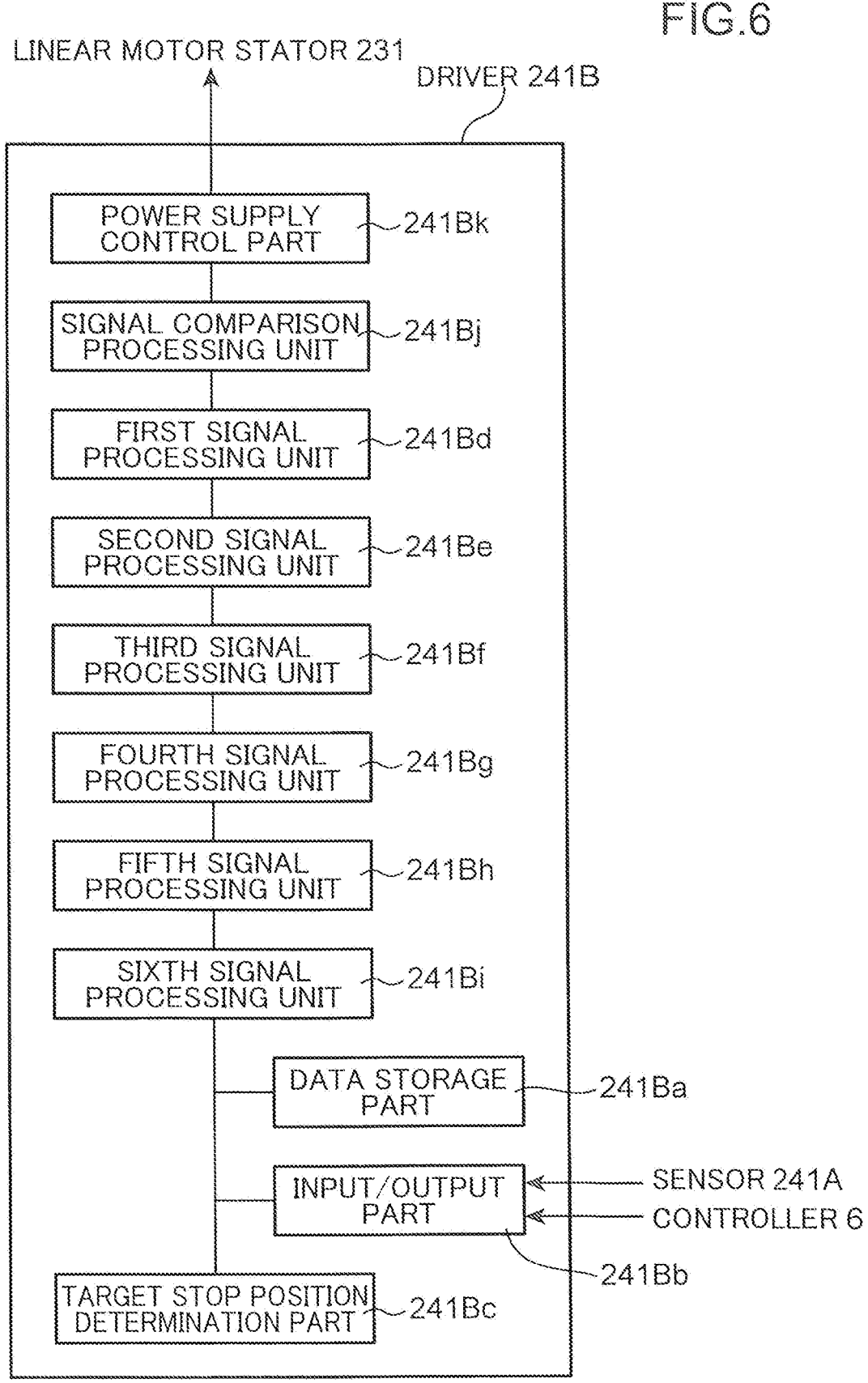
FIG. 6 is a block diagram showing a functional configuration of a driver of a sensor structural body.

Specifically, the sensor structural body 241 includes a sensor 241A that detects the displacement relative to the scale 34 attached to the slider 3, and a driver 241B that drives the linear motor. The scale 34 and the sensor structural bodies 241 constituting the position detecting device are described in detail with reference to FIGS. 4 to 6. FIG. 4 is a diagram schematically showing configurations of the sensor 241A and the scale 34. FIG. 5 is a diagram showing an output signal from the sensor 241A. FIG. 6 is a block diagram showing a functional configuration of the driver 241B of the sensor structural body 241.

As shown in FIG. 4, the scale 34 attached to the slider 3 is a magnetic scale which has a first track T1, a second track T2, and a third track T3 provided on the scale substrate 342, the substrate 342 having a form of a plate elongate in the slider moving direction F (X direction) and facing the sensors 241A (first to third sensors 241Aa to 241Ac), the first to third tracks T1 to T3 being disposed next to another along the direction perpendicular to the slider moving direction F (Y direction).

Length L1 of the scale 34 (scale length) along the slider moving direction F is, for example, 130 mm, and width W1 of the scale 34 (scale width) along the width direction is, for example, 18 mm.

The first track T1 of the scale 34 faces the first sensor 241Aa and has a form of a row of a plurality of scale marks T1M disposed at a first interval P1 along the slider moving direction F. Specifically, the scale marks T1M are each a permanent magnet. The permanent magnets constituting the first track T1 are disposed in a row at the first interval P1 with the N poles and the S poles of the permanent magnets alternately pointing opposite sides. The length in the width direction of the first track T1 (first track width) is, for example, 2.3 mm, and the first interval P1 is, for example, 1.28 mm.

The second track T2 of the scale 34 faces the second sensor 241Ab and has a form of a row of a plurality of scale marks T2M disposed at a second interval P2 along the slider moving direction F. Specifically, the scale marks T2M are each a permanent magnet. Like the first track T1, the permanent magnets constituting the second track T2 are disposed in a row at the second interval P2 with the N poles and the S poles of the permanent magnets alternately pointing opposite sides. The length in the width direction of the second track T2 (second track width) is, for example, 2.3 mm, and the second interval P2 is, for example, 1.28 mm which is the same as the first interval P1.

The third track T3 of the scale 34 faces the third sensor 241Ac and has a form of a row of a plurality of scale marks T3M disposed at a third interval P3 along the slider moving direction F. Specifically, the scale marks T3M are each a permanent magnet. Like the first track T1, the permanent magnets constituting the third track T3 are disposed in a row at the third interval P3 with the N poles and the S poles of the permanent magnets alternately pointing opposite sides. The length in the width direction of the third track T3 (third track width) is, for example, 2.3 mm, and the third interval P3 is, for example, 1.28 mm which is the same as the first interval P1.

In this embodiment, as shown in FIG. 4, the scale 34 is provided with a fourth track T4, a fifth track T5, and a sixth track T6 on the scale substrate 342 facing the sensor 241A.

The fourth track T4 of the scale 34 is provided between the first track T1 and the second track T2 and faces the first sensor 241Aa. The fourth track T4 has a form of a row of a plurality of scale marks T4M disposed at a fourth interval P4 along the slider moving direction F. Specifically, the scale marks T4M are each a permanent magnet. The permanent magnets constituting the fourth track T4 are disposed in a row at the fourth interval P4 with the N poles and the S poles of the permanent magnets alternately pointing opposite sides. The length in the width direction of the fourth track T4 (fourth track width) is, for example, 2.3 mm, and the fourth interval P4 is, for example, 1.30 mm which is different from the first interval P1.

The fifth track T5 of the scale 34 is provided between the second track T2 and the third track T3 and faces the second sensor 241Ab. The fifth track T5 has a form of a row of a plurality of scale marks T5M disposed at a fifth interval P5 along the slider moving direction F. Specifically, the scale marks T5M are each a permanent magnet. The permanent magnets constituting the fifth track T5 are disposed in a row at the fifth interval P5 with the N poles and the S poles of the permanent magnets alternately pointing opposite sides. The length in the width direction of the fifth track T5 (fifth track width) is, for example, 2.3 mm, and the fifth interval P5 is, for example, 1.30 mm which is the same as the fourth interval P4.

The sixth track T6 of the scale 34 is provided next to the third track T3, but in the side opposite the fifth track T5, and faces the third sensor 241Ac. The sixth track T6 has a form of a row of a plurality of scale marks T6M disposed at a sixth interval P6 along the slider moving direction F. Specifically, the scale marks T6M are each a permanent magnet. The permanent magnets constituting the sixth track T6 are disposed in a row at the sixth interval P6 with the N poles and the S poles of the permanent magnets alternately pointing opposite sides. The length in the width direction of the sixth track T6 (sixth track width) is, for example, 2.3 mm, and the sixth interval P6 is, for example, 1.30 mm which is the same as the fourth interval P4.

The sensor 241A (the first to third sensors 241Aa to 241Ac) of the sensor structural body 241 of the motor drive unit 24 are magnetic sensors, such as Hall elements and MR elements. The first sensor 241Aa detects the relative displacement corresponding to the magnetic field of each of the first track T1 to the fourth track T4. The second sensor 241Ab detects the relative displacement corresponding to the magnetic field of each of the second track T2 and the fifth track T5. The third sensor 241Ac detects the relative displacement corresponding to the magnetic field of each of the third track T3 and the sixth track T6.

According to the displacement detected from the magnetic field, the first sensor 241Aa, the second sensor 241Ab, and the third sensor 241Ac output two-phase sinusoidal wave signals φA and φB each having an amplitude of R and a phase of θ as shown in FIG. 5 and expressed by Equation (1) listed below.

$$\phi A = R \cdot \cos\theta, \phi B = R \cdot \sin\theta \quad (1)$$

Specifically, the first sensor 241Aa detects the displacement relative to the first track T1 and outputs a first two-phase sinusoidal wave signal having a first wavelength corresponding to the first interval P1. The second sensor 241Ab detects the displacement relative to the second track T2 and outputs a second two-phase sinusoidal wave signal having a second wavelength corresponding to the second interval P2. The third sensor 241Ac detects the displacement relative to the third track T3 and outputs a third two-phase sinusoidal wave signal having a third wavelength corresponding to the third interval P3. The first wavelength of the first two-phase sinusoidal wave signal is twice the first interval P1. The second wavelength of the second two-phase sinusoidal wave signal is twice the second interval P2. The third wavelength of the third two-phase sinusoidal wave signal is twice the third interval P3. Since the first interval P1, the second interval P2, and the third interval P3 take the same value, the first wavelength, the second wavelength, and the third wavelength take the same value.

The first sensor 241Aa detects the displacement relative to the fourth track T4 and outputs a fourth two-phase sinusoidal wave signal having a fourth wavelength corresponding to the fourth interval P4. The second sensor 241Ab detects the displacement relative to the fifth track T5 and outputs a fifth two-phase sinusoidal wave signal having a fifth wavelength corresponding to the fifth interval P5. The third sensor 241Ac detects the displacement relative to the sixth track T6 and outputs a sixth two-phase sinusoidal wave signal having a sixth wavelength corresponding to the sixth interval P6. The fourth wavelength of the fourth two-phase sinusoidal wave signal is twice the fourth interval P4. The fifth wavelength of the fifth two-phase sinusoidal wave signal is twice the fifth interval P5. The sixth wavelength of the sixth two-phase sinusoidal wave signal is twice the sixth interval P6. Since the fourth interval P4, the fifth interval P5, and the sixth interval P6 take the same value, the fourth wavelength, the fifth wavelength, and the sixth wavelength take the same value. Meanwhile, the fourth interval P4, the fifth interval P5, and the sixth interval P6 take a value different from the first interval P1, the second interval P2, and the third interval P3, so that the fourth wavelength, the fifth wavelength, and the sixth wavelength take a value different from the first wavelength, the second wavelength, and the third wavelength.

The driver 241B of the sensor structural body 241 is used for the drive control of the linear motor including the linear motor stator 231 of the stator unit 23 and the linear motor mover 32 of the slider 3. As shown in FIG. 6, the driver 241B is connected to the sensor 241A to receive an output signal (two-phase sinusoidal wave signal) from the sensor 241A which forms the sensor structural body 241 to which the driver 241B per se belongs. The driver 241B is also connected to a controller 6 to transmit data therebetween. The controller 6 transmits target stop position data to the driver 241B of the sensor structural body 241. The target stop position data indicates the target stop position where the slider 3 stops.

The driver 241B of each sensor structural body 241 includes a data storage part 241Ba, an input/output part 241Bb, a target stop position determination part 241Bc, a first signal processing unit 241Bd, a second signal processing unit 241Be, a third signal processing unit 241Bf, a fourth signal processing unit 241Bg, a fifth signal processing unit 241Bh, a sixth signal processing unit 241Bi, a signal comparison processing unit 241Bj (an example information processing unit), and a power supply control part 241Bk.

Figure 7B:
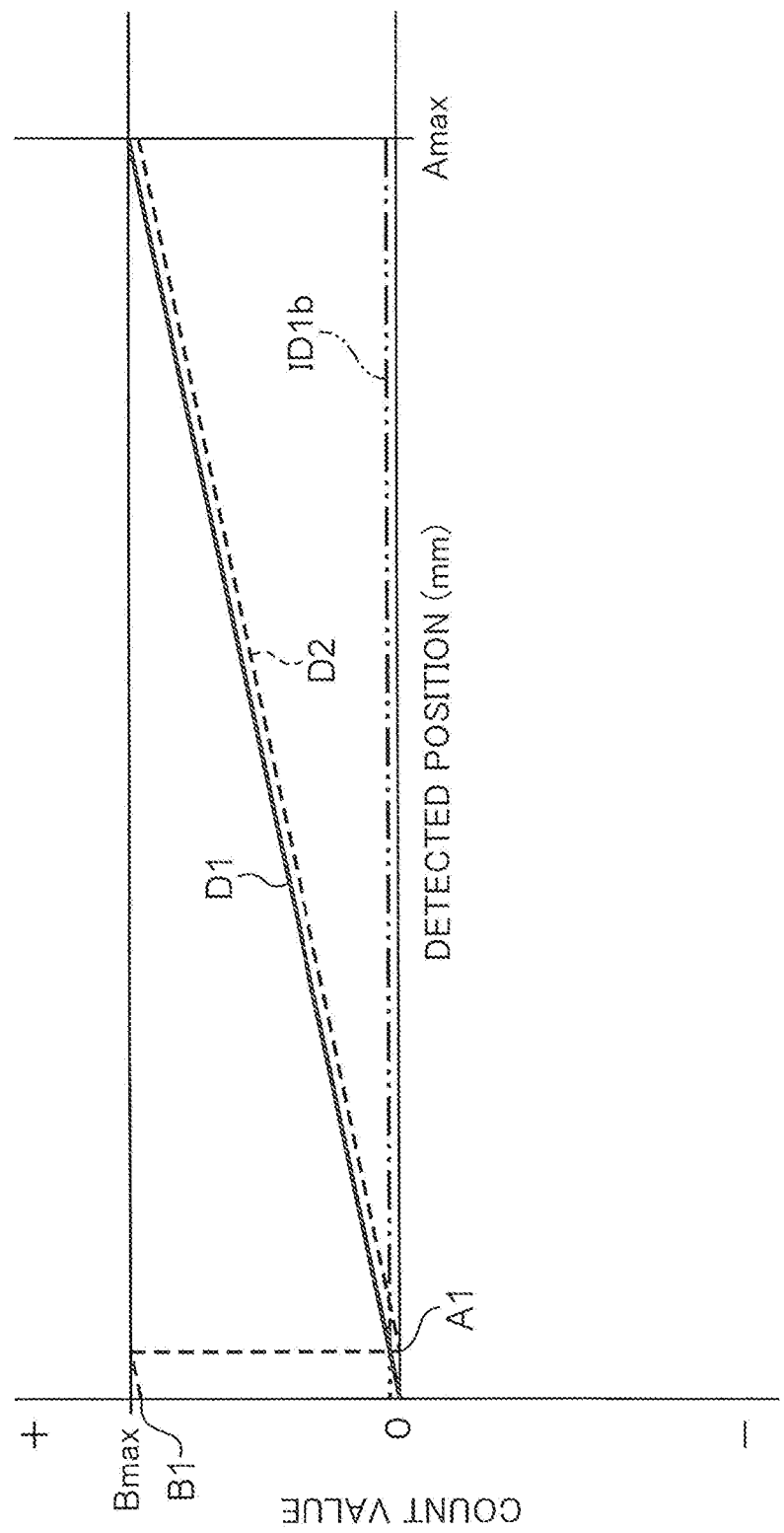
FIG. 7B is a diagram for describing interpolation processing performed by the first and second signal processing units in the driver and identification information generating processing performed by the signal comparison processing unit in the driver.

The details on the driver 241B are described with reference to FIG. 6 and also with FIGS. 7A, 7B, 8A, and 8B. FIGS. 7A and 7B are diagrams for describing interpolation processing performed by the first and second signal processing units 241Bd and 241Be in the driver 241B and identification information generating processing performed by the signal comparison processing unit 241Bj. FIGS. 8A and 8B are diagrams for describing interpolation processing performed by the first and third signal processing units 241Bd and 241Bf in the driver 241B and identification information generating processing performed by the signal comparison processing unit 241Bj.

The input/output part 241Bb of each driver 241B is a part to which an output signal from the sensor 241A which forms the sensor structural body 241 to which the input/output part 241Bb per se belongs, and the target stop position data from the controller 6 are inputted. The output signal output from the sensor 241A and the target stop position data from the controller 6 that are input to the input/output part 241Bb are stored in the data storage part 241Ba.

The target stop position determination part 241Bc of each driver 241B determines whether the target stop position indicated by the target stop position data transmitted from the controller 6 is a sensor facing position where the slider 3 stops to face the sensor 241A which forms the sensor structural body 241 to which the target stop position determination part 241Bc per se belongs.

The first signal processing unit 241Bd of each driver 241B performs predetermined first interpolation processing on the output signal (the first two-phase sinusoidal wave signal) from the first sensor 241Aa, the output signal corresponding to the first track T1 detected by the first sensor 241Aa, to generate data having a phase of θ expressed by Equation (2) listed below, generates positional data D (first positional data) expressed by Equation (3) listed below based on the data having a phase of θ, and outputs the positional data D. The phase θ is calculated using φA and φB in Equation (1) listed above, and the positional data D is calculated using the phase θ and signal wavelength λ (first wavelength).

$$\theta = \tan^{-1}(\phi B/\phi A) \quad (2)$$

$$D = (\lambda/2\pi)\cdot\theta \quad (3)$$

The first interpolation processing performed by the first signal processing unit 241Bd is described in detail with reference to FIGS. 7A to 8B. The first interpolation processing is performed by dividing, by a predetermined number, the first wavelength of the first two-phase sinusoidal wave signal that is output from the first sensor 241Aa to obtain a first resolution unit-length, and calculates the accumulated value of the first count value at every first resolution unit-length along the first wavelength to generate the first positional data. In this embodiment, the first signal processing unit 241Bd compares the first positional data with the fourth positional data generated by the fourth signal processing unit 241Bg, which is described later, and directly obtains the accumulated value of the first count value instead of counting up the first values from the end of the scale 34. That is, the accumulated value of the first count value corresponds to the absolute position of the first sensor 241Aa with respect to the scale 34. A solid line D1 shown in each of FIGS. 7A to 8B represents plotted values indicating correlation between the first count value for every first resolution unit-length and the first positional data. As shown by the solid line D1, the first interpolation processing performed by the first signal processing unit 241Bd is such that the first count value takes a start value of "0 (zero)" corresponding to a start-point of detection where the first sensor 241Aa starts detecting the first track T1 on the scale 34 (point of origin=0 (zero)), and the accumulated value of the first count value linearly increases from the start-point of detection (point of origin=0 (zero)) to a finish-point of detection (Amax). The end value of the first count value corresponding to a finish-point of detection (Amax) is the maximum value of the first count value (Bmax). The length from the start-point of detection (point of origin=0 (zero)) to the finish-point of detection (Amax) along the first track T1 on the scale 34 corresponds to the scale length L1 of the scale 34.

The first resolution of the first interpolation processing performed by the first signal processing unit 241Bd is, for example, about 0.156 μm, whereas the first wavelength of the first two-phase sinusoidal wave signal output from the first sensor 241Aa is, for example, about 2.56 mm (twice the first interval P1=1.28 mm).

The second signal processing unit 241Be of each driver 241B performs predetermined second interpolation processing on the output signal (the second two-phase sinusoidal wave signal) from the second sensor 241Ab, the output signal corresponding to the second track T2 detected by the second sensor 241Ab, to generate data having a phase of θ expressed by Equation (2) listed above, generates positional data D (second positional data) expressed by Equation (3) listed above based on the data having a phase of θ, and outputs the positional data D. The phase θ is calculated using φA and φB in Equation (1) listed above, and the positional data D is calculated using the phase θ and signal wavelength λ (second wavelength).

The second interpolation processing performed by the second signal processing unit 241Be is described in detail with reference to FIGS. 7A and 7B. The second interpolation processing is performed by dividing, by a predetermined number, the second wavelength of the second two-phase sinusoidal wave signal output from the second sensor 241Ab to obtain a second resolution unit-length, and calculates the accumulated value of the second count value at every second resolution unit-length along the second wavelength to generate the second positional data. In this embodiment, the second signal processing unit 241Be compares the second positional data with the fifth positional data generated by the fifth signal processing unit 241Bh, which is described later, and directly obtains the accumulated value of the second count value instead of counting up the second count values from the end of the scale 34. That is, the accumulated value of the second count value corresponds to the absolute position of the second sensor 241Ab with respect to the scale 34. The second resolution of the second interpolation processing performed by the second signal processing unit 241Be is, for example, about 0.156 μm, whereas the second wavelength of the second two-phase sinusoidal wave signal output from the second sensor 241Ab is, for example, about 2.56 mm (twice the second interval P2=1.28 mm). The second resolution of the second interpolation processing performed by the second signal processing unit 241Be takes the same value as the first resolution of the first interpolation processing performed by the first signal processing unit 241Bd.

A broken line D2 shown in each of FIGS. 7A and 7B represents plotted values indicating correlation between the second count value for every second resolution unit-length and the second positional data. As shown by the broken line D2, the second interpolation processing performed by the second signal processing unit 241Be is such that the second count value takes a start value (B1) corresponding to a start-point of detection where the second sensor 241Ab starts detecting the second track T2 on the scale 34 (point of origin=0 (zero)), where the start value (B1) is not "0 (zero)" but a value different from the start value of the first count value for the first interpolation processing performed by the first signal processing unit 241Bd. The accumulated value of the second count value linearly increases from the start-point of detection (point of origin=0 (zero)) and takes the maximum value (Bmax) of the second count value at a first mid-point of detection (A1) that comes before a finish-point of detection (Amax). The maximum value of the second count value takes the same value as the maximum value of the first count value.

Moreover, the second interpolation processing performed by the second signal processing unit 241Be is such that the count value is set to "0 (zero)" again if the second count value corresponding to the first mid-point of detection (A1) takes the maximum value (Bmax), and then the accumulated value of the second count value linearly increases from the first mid-point of detection (A1) to the finish-point of detection (Amax). The length from the start-point of detection (point of origin=0 (zero)) to the finish-point of detection (Amax) along the second track T2 on the scale 34 corresponds to the scale length L of the scale 34.

As can be understood by comparing the plotted values represented by the solid line D1 and the plotted values represented by the broken line D2 in FIGS. 7A and 7B, comparing at a particular count value, the second positional data generated by the second interpolation processing performed by the second signal processing unit 241Be is different from the first positional data generated by the first interpolation processing performed by the first signal processing unit 241Bd.

The third signal processing unit 241Bf of each driver 241B performs predetermined third interpolation processing on the output signal (the third two-phase sinusoidal wave signal) from the third sensor 241Ac, the output signal corresponding to the third track T3 detected by the third sensor 241Ac, to generate data having a phase of θ expressed by Equation (2) listed above, generates positional data D (third positional data) expressed by Equation (3) listed above based on the data having a phase of θ, and outputs the positional data D. The phase θ is calculated using φA and φB in Equation (1) listed above, and the positional data D is calculated using the phase θ and signal wavelength λ (third wavelength).

The third interpolation processing performed by the third signal processing unit 241Bf is described in detail with reference to FIGS. 8A and 8B. The third interpolation processing is performed by dividing, by a predetermined number, the third wavelength of the third two-phase sinusoidal wave signal output from the third sensor 241Ac to obtain a third resolution unit-length, and calculates the accumulated value of the third count value at every third resolution unit-length along the third wavelength to generate the third positional data. In this embodiment, the third signal processing unit 241Bf compares the third positional data with the sixth positional data generated by the sixth signal processing unit 241Bi, which is described later, and directly obtains the accumulated value of the third count value instead of counting up the third count values from the end of the scale 34. That is, the accumulated value of the third count value corresponds to the absolute position of the third sensor 241Ac with respect to the scale 34. The third resolution of the third interpolation processing performed by the third signal processing unit 241Bf is, for example, about 0.156 µm, whereas the third wavelength of the third two-phase sinusoidal wave signal output from the third sensor 241Ac is, for example, about 2.56 mm (twice the third interval P3=1.28 mm). The third resolution of the third interpolation processing performed by the third signal processing unit 241Bf takes the same value as the first resolution of the first interpolation processing performed by the first signal processing unit 241Bd.

A broken line D3 shown in each of FIGS. 8A and 8B represents plotted values indicating correlation between the third count value for every third resolution unit-length and the third positional data. As shown by the broken line D3, the third interpolation processing performed by the third signal processing unit 241Bf is such that the third count value takes a start value (B2) corresponding to a start-point of detection where the third sensor 241Ac starts detecting the third track T3 on the scale 34 (point of origin=0 (zero)), where the start value (B2) is not "0 (zero)" but a value different from the start value of the first count value for the first interpolation processing performed by the first signal processing unit 241Bd. Moreover, the start value (B2) of the third count value for the third interpolation processing performed by the third signal processing unit 241Bf is set to a value different from the start value (B1) of the second count value for the second interpolation processing performed by the second signal processing unit 241Be. The accumulated value of the third count value linearly increases from the start-point of detection (point of origin=0 (zero)) and takes the maximum value (Bmax) of the third count value at a second mid-point of detection (A2) that comes before a finish-point of detection (Amax). The maximum value of the third count value takes the same value as the maximum value of the first count value.

Moreover, the third interpolation processing performed by the third signal processing unit 241Bf is such that the count value is set to "0 (zero)" again if the third count value corresponding to the second mid-point of detection (A2) takes the maximum value (Bmax), and then the accumulated value of the third count value linearly increases from the second mid-point of detection (A2) to the finish-point of detection (Amax). The length from the start-point of detection (point of origin=0 (zero)) to the finish-point of detection (Amax) along the third track T3 on the scale 34 corresponds to the scale length L of the scale 34.

As can be understood by comparing the plotted values represented by the solid line D1 and the plotted values represented by the broken line D3 in FIGS. 8A and 8B, comparing at a particular count value, the third positional data generated by the third interpolation processing performed by the third signal processing unit 241Bf is different from the first positional data generated by the first interpolation processing performed by the first signal processing unit 241Bd. Comparing at a particular count value, the third positional data generated by the third interpolation processing performed by the third signal processing unit 241Bf is also different from the second positional data generated by the second interpolation processing performed by the second signal processing unit 241Be.

The fourth signal processing unit 241Bg of each driver 241B performs predetermined fourth interpolation processing on the output signal (the fourth two-phase sinusoidal wave signal) from the first sensor 241Aa, the output signal corresponding to the fourth track T4 detected by the first sensor 241Aa, to generate data having a phase of θ expressed by Equation (2) listed above, generates positional data D (fourth positional data) expressed by Equation (3) listed above based on the data having a phase of θ, and outputs the positional data D. The phase θ is calculated using φA and φB in Equation (1) listed above, and the positional data D is calculated using the phase θ and signal wavelength λ (fourth wavelength).

The fourth wavelength of the fourth two-phase sinusoidal wave signal (twice the fourth interval P4=1.30 mm) is not identical to the first wavelength of the first two-phase sinusoidal wave signal (twice the first interval P1=1.28 mm). Thus, the fourth positional data generated by the fourth signal processing unit 241Bg is different from the first positional data generated by the first signal processing unit 241Bd. The fourth positional data is compared with the first positional data by the first signal processing unit 241Bd and used for obtaining the absolute position of the first sensor 241Aa (accumulated value of the first count value) on the scale 34. The fourth track T4 on the scale 34 and the fourth signal processing unit 241Bg that processes the output signal from the first sensor 241Aa related to the fourth track T4 are not always necessary. With the fourth track T4 and the fourth signal processing unit 241Bg provided, the absolute position of the first sensor 241Aa (accumulated value of the first count value) on the scale 34 can directly be obtained by comparing the first positional data with the fourth positional data instead of counting up from the end of the scale 34.

The fifth signal processing unit 241Bh of each driver 241B performs predetermined fifth interpolation processing on the output signal (the fifth two-phase sinusoidal wave signal) from the second sensor 241Ab, the output signal corresponding to the fifth track T5 detected by the second sensor 241Ab, to generate data having a phase of θ expressed by Equation (2) listed above, generates positional data D (fifth positional data) expressed by Equation (3) listed above based on the data having a phase of θ, and outputs the positional data D. The phase θ is calculated using φA and φB in Equation (1) listed above, and the positional data D is calculated using the phase θ and signal wavelength λ (fifth wavelength).

The fifth wavelength of the fifth two-phase sinusoidal wave signal (twice the fifth interval P5=1.30 mm) is not identical to the second wavelength of the second two-phase sinusoidal wave signal (twice the second interval P2=1.28 mm). Thus, the fifth positional data generated by the fifth signal processing unit 241Bh is different from the second positional data generated by the second signal processing unit 241Be. The fifth positional data is compared with the second positional data by the second signal processing unit 241Be and used for obtaining the absolute position of the second sensor 241Ab (accumulated value of the second count value) on the scale 34. The fifth track T5 on the scale 34 and the fifth signal processing unit 241Bh that processes the output signal from the second sensor 241Ab related to the fifth track T5 are not always necessary. With the fifth track T5 and the fifth signal processing unit 241Bh provided however, the absolute position of the second sensor 241Ab (accumulated value of the second count value) on the scale 34 can directly be obtained by comparing the second positional data with the fifth positional data instead of counting up from the end of the scale 34.

The sixth signal processing unit 241Bi of each driver 241B performs predetermined sixth interpolation processing on the output signal (the sixth two-phase sinusoidal wave signal) from the third sensor 241Ac, the output signal corresponding to the sixth track T6 detected by the third sensor 241Ac, to generate data having a phase of θ expressed by Equation (2) listed above, generates positional data D (sixth positional data) expressed by Equation (3) listed above based on the data having a phase of θ, and outputs the positional data D. The phase θ is calculated using φA and φB in Equation (1) listed above, and the positional data D is calculated using the phase θ and signal wavelength λ (sixth wavelength).

The sixth wavelength of the sixth two-phase sinusoidal wave signal (twice the sixth interval P6=1.30 mm) is not identical to the third wavelength of the third two-phase sinusoidal wave signal (twice the third interval P3=1.28 mm). Thus, the sixth positional data generated by the sixth signal processing unit 241Bi is different from the third positional data generated by the third signal processing unit 241Bf. The sixth positional data is compared with the third positional data by the third signal processing unit 241Bf and used for obtaining the absolute position of the third sensor 241Ac (accumulated value of the third count value) on the scale 34. The sixth track T6 on the scale 34 and the sixth signal processing unit 241Bi that processes the output signal from the third sensor 241Ac related to the sixth track T6 are not always necessary. With the sixth track T6 and the sixth signal processing unit 241Bi provided however, the absolute position of the third sensor 241Ac (accumulated value of the third count value) on the scale 34 can directly be obtained by comparing the third positional data with the sixth positional data instead of counting up from the end of the scale 34.

The signal comparison processing unit 241Bj of each driver 241B uses the first positional data generated by the first signal processing unit 241Bd, the second positional data generated by the second signal processing unit 241Be, and the third positional data generated by the third signal processing unit 241Bf to perform processing of identifying the slider 3 to be moved and processing of identifying the position of the slider 3. The signal comparison processing unit 241Bj recognizes the first positional data as the positional information of the slider 3. The signal comparison processing unit 241Bj generates and outputs first identification information that corresponds to the difference between the first positional data and the second positional data and is unique to the slider 3, and also generates and outputs second identification information that corresponds to the difference between the first positional data and the third positional data and is unique to the slider 3.

The processing of generating the first identification information and the second identification information performed by the signal comparison processing unit 241Bj is described in detail below with reference to FIGS. 7A to 8B.

The processing of generating the first identification information performed by the signal comparison processing unit 241Bj is described with reference to FIGS. 7A and 7B. The signal comparison processing unit 241Bj subtracts the second count value for the second interpolation processing performed by the second signal processing unit 241Be from the first count value for the first interpolation processing performed by the first signal processing unit 241Bd to calculate a subtracted value. The subtracted value is determined as the first identification information. A dot-and-dash line ID1$a$ shown in FIG. 7A represents plotted values indicating the subtracted value.

In a case where the subtracted value is negative, the signal comparison processing unit 241Bj adds the maximum value of the first count value (Bmax) to the subtracted value, and determines the resulting value as corrected first identification information. A two-dot-and dash line ID1$b$ shown in FIG. 7B represents plotted values indicating the corrected first identification information. As described above, in a case where the subtracted value is negative, the first identification information is corrected to take a constant value, regardless of to which position on the first track T1 on the scale 4 the first positional data, which is the positional information of the slider 3 corresponding to the accumulated value of the first count value, corresponds. In other words, the first identification information takes a constant value regardless of in which position between both the end portions of the first track T1, regarding the slider moving direction F, the detected position of the first sensor 241Aa on the first track T1 on the scale 4 is.

The processing of generating the second identification information performed by the signal comparison processing unit 241Bj is described with reference to FIGS. 8A and 8B. The signal comparison processing unit 241Bj subtracts the third count value for the third interpolation processing performed by the third signal processing unit 241Bf from the first count value for the first interpolation processing performed by the first signal processing unit 241Bd to calculate a subtracted value. The subtracted value is determined as the second identification information. A dot-and-dash line ID2a shown in FIG. 8A represents plotted values indicating the subtracted value.

In a case where the subtracted value is negative, the signal comparison processing unit 241Bj adds the maximum value of the first count value (Bmax) to the subtracted value, and determines the resulting value as corrected second identification information. A two-dot-and dash line ID2b shown in FIG. 8B represents plotted values indicating the corrected second identification information. As described above, in a case where the subtracted value is negative, the second identification information is corrected to take a constant value, regardless of in which position between both the end portions, regarding the slider moving direction F, on the first track T1 on the scale 4 the detected position of the first sensor 241Aa is.

Based on the first positional data, which is the positional information of the slider 3 recognized by the signal comparison processing unit 241Bj and the first identification information generated by the signal comparison processing unit 241Bj (or the second identification information as required), the power supply control part 241Bk of each driver 241B performs power-control of the linear motor stator 231 corresponding to the sensor structural body 241 to which the power supply control part 241Bk per se belongs, to drive the linear motor including the linear motor stator 231 and the linear motor mover 32 attached to the slider 3. In this embodiment, the power supply control part 241Bk of the driver 241B which includes the target stop position determination part 241Bd which determines that the target stop position which the target stop position data transmitted from the controller 6 indicates is the sensor facing position at which the slider 3 is stopped in an facing manner with the sensor 241A which forms the sensor structural body 241 to which the power supply control part 241g per se belongs performs the power supply control of the linear motor stator 231 so as to stop the slider 3 at the target stop position.

As described above, the position detecting device including the scale 34 attached to the slider 3, and the sensor structural bodies 241 of the motor drive unit 24 is such that the first to third sensors 241Aa to 241Ac respectively detect displacements relative to the first track T1, the second track T2, and the third track T3 on the scale 34, and the first to third signal processing units 241Bd to 241Bf respectively generate the first positional data, the second positional data, and the third positional data based on the output signals from the first to third sensors 241Aa to 241Ac. The signal comparison processing unit 241Bj recognizes the first positional data as the positional information of the slider 3, generates the first identification information that corresponds to the difference between the second positional data and the first positional data and is unique to the slider 3, and generates the second identification information that corresponds to the difference between the third positional data and the first positional data and is unique to the slider 3.

With the position detecting device such configured, the position of the slider 3 can be identified based on the first positional data that the signal comparison processing unit 241Bj recognizes as the positional information, and the slider 3 to be moved can be identified based on the first identification information (or the second identification information as required) generated by the signal comparison processing unit 241Bj. The linear conveyor device 1 is such that the position detecting device for identifying the position of the slider 3 that moves along the predetermined slider moving direction F also identifies the slider 3 to be moved, so that no mechanism for identifying the slider 3 to be moved is necessary in addition to the position detecting device. Thus, the device can be configured simple.

<Exemplary Modification of Scale>

Figure 9A:
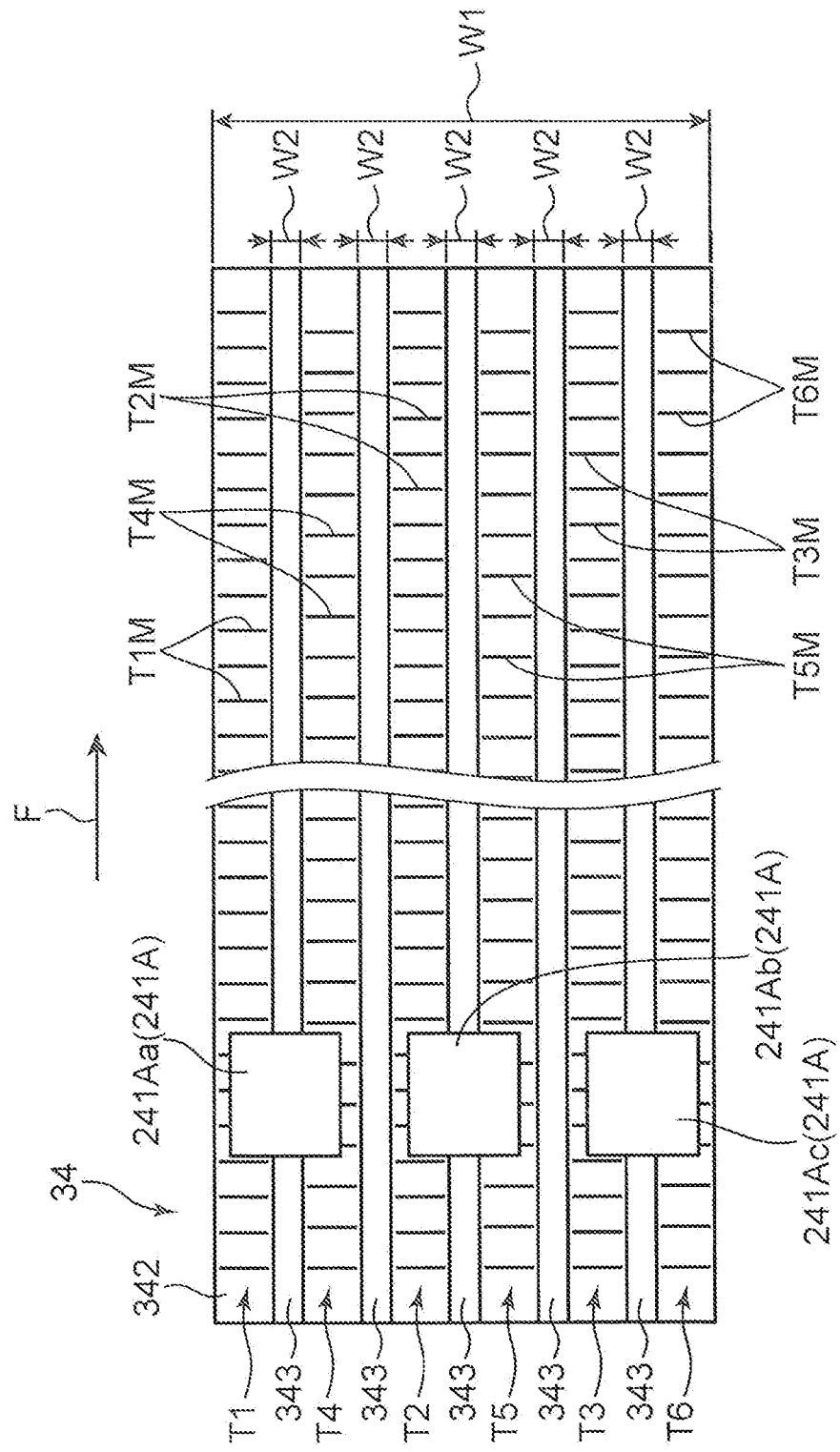
FIG. 9A is a diagram showing a modification of the scale.

FIGS. 9A and 9B show a modification of the scale 34. Except for a groove 343, the scale 34 shown in FIGS. 9A and 9B is configured the same as the scale 34 shown in FIG. 4.

On the surface of the scale substrate 342 of the scale 34 facing the sensor 241A, the grooves 343 extending along the slider moving direction F are provided between the first track T1 and the fourth track T4, between the fourth track T4 and the second track T2, between the second track T2 and the fifth track T5, between the fifth track T5 and the third track T3, and between the third track T3 and the sixth track T6.

The grooves 343 have the same shape and a cross section of a square, for example. Height H1 of the scale substrate 342 is, for example, 2.0 mm, whereas depth H2 of each groove 343 is, for example, 0.3 mm or larger (specifically, 0.5 mm for example). The scale width W1 of the scale 34 is, for example, 18 mm and the track width of each of the first to sixth tracks T1 to T6 is, for example, 2.3 mm, whereas groove width W2 of each of the grooves 343 is one sixth or more of the wavelength of the first to third two-phase sinusoidal wave signals output from the first to third sensors 241Aa to 241Ac (the first wavelength, the second wavelength, and the third wavelength). Specifically, the first wavelength, the second wavelength, and the third wavelength are, for example, 2.56 mm, whereas the groove width W2 of each of the grooves 343 is, for example, 0.8 mm.

Figure 10A:
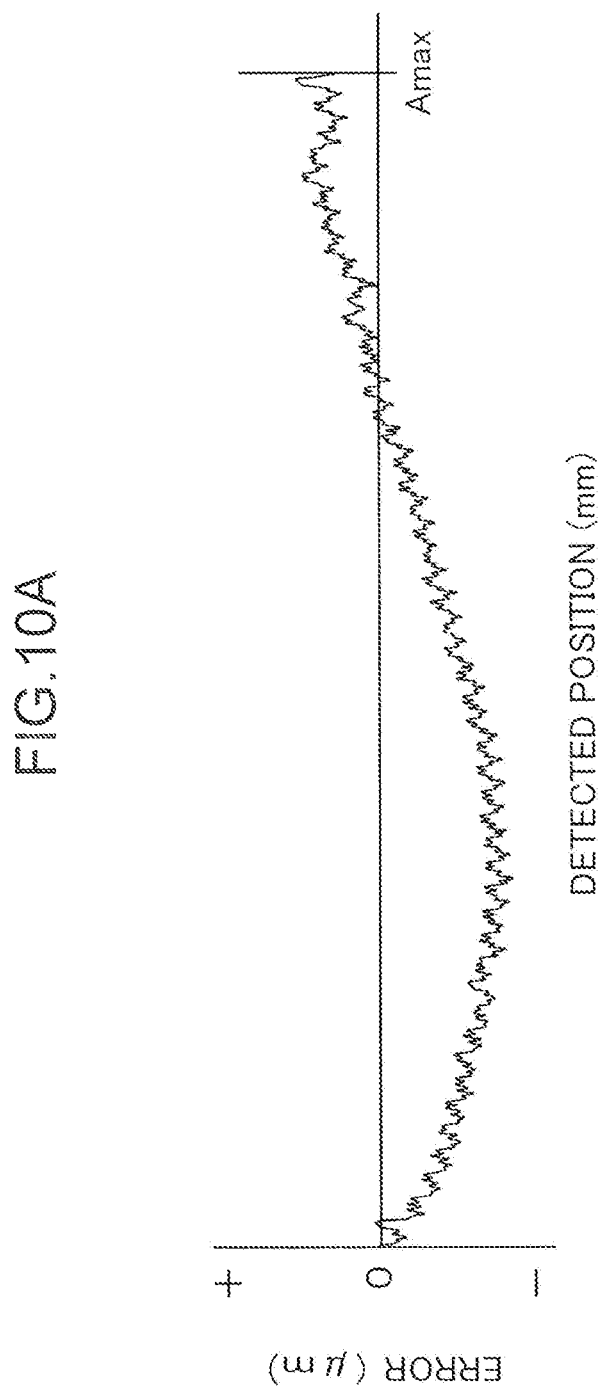
FIG. 10A is a diagram for describing detection accuracy of the sensor in which the scale shown in FIG. 4 is used.
Figure 10B:
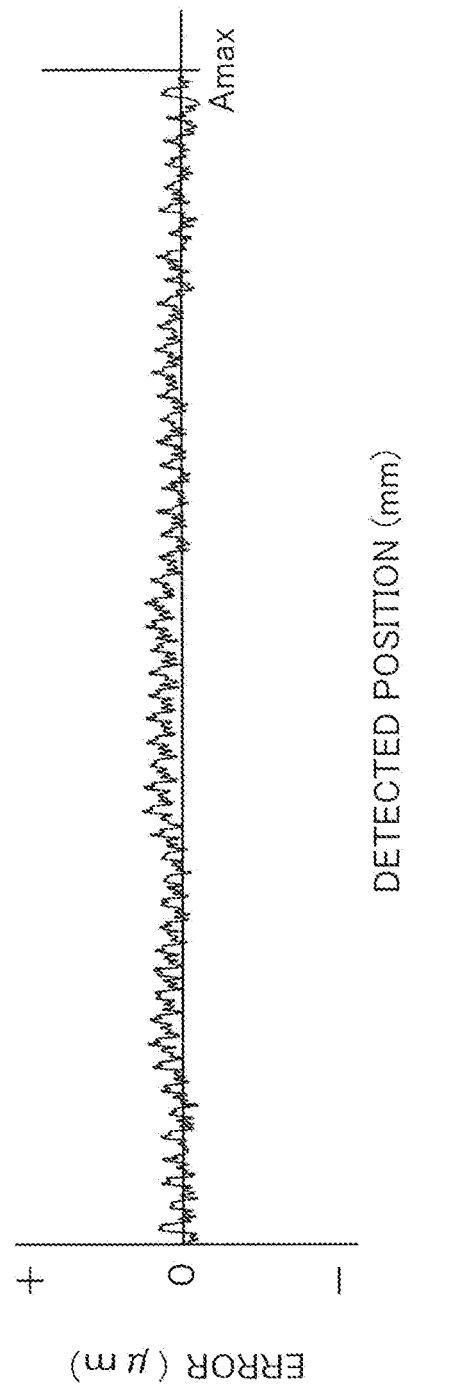
FIG. 10B is a diagram for describing detection accuracy of the sensor in which the scale shown in FIGS. 9A and 9B is used.

The effect obtained by the scale 34 having the grooves 343 is described with reference to FIGS. 10A and 10B. FIG. 10A is a diagram for describing detection accuracy of the sensor 241A when the scale 34 shown in FIG. 4 is used. FIG. 10B is a diagram for describing detection accuracy of the sensor 241A when the scale 34 having the grooves 343 shown in FIGS. 9A and 9B is used. As can be understood by comparing FIG. 10A with FIG. 10B, the grooves 343 prevent magnetic interference that might occur when the first to third sensor 241Aa to 241Ac, which are magnetic sensors, detect displacements relative to the first to sixth tracks T1 to T6 on the scale 34 from the magnetic field. Detection accuracy of the first to third sensors 241Aa to 241Ac can thus be improved. The detection accuracy for a case using the scale 34 having no groove 343 as shown in FIG. 4 allows an error of approximately 30 μm, whereas the detection accuracy for a case using the scale 34 having grooves 343 as shown in FIGS. 9A and 9B allows an error of approximately 5 μm.

The position detecting device and the linear conveyor device according to the embodiment of the present disclosure are described above. However, the present disclosure is not limited to the above embodiment and can take a form of a modification as described below.

The embodiment described above includes the sensor 241A comprising the first to third sensors 241Aa to 241Ac, and the scale 34 provided with the first to third tracks T1 to T3 and the fourth to sixth tracks T4 to T6. The present disclosure is not limited to such a configuration. The sensor 241A may include at least the first and second sensors 241Aa and 241Ab, and the scale 34 may include at least the first and second tracks T1 and T2 respectively facing the first and second sensors 241Aa and 241Ab.

In such a configuration, the first sensor 241Aa detects the displacement relative to the first track T1, and the second sensor 241Ab detects the displacement relative to the second track T2. The first signal processing unit 241Bd of the driver 241B generates the first positional data based on an output signal from the first sensor 241Aa, and the second signal processing unit 241Be of the driver 241B generates the second positional data based on an output signal from the second sensor 241Ab. The signal comparison processing unit 241Bj of the driver 241B recognizes the first positional data as positional information related to the slider 3, and generates identification information unique to the slider 3 based on the first positional data and the second positional data. In such a manner, the position of the slider 3 can be identified based on the first positional data that the signal comparison processing unit 241Bj recognizes as the positional information, and the slider 3 to be moved can be identified based on the identification information generated by the signal comparison processing unit 241Bj.

The position detecting device of the embodiment described above is of a magnetic type including the scale 34 that is a magnetic scale and the sensor 241A that is a magnetic sensor. The present disclosure is not limited to such a configuration. The position detecting device may be of a photoelectric type including a scale having optical grid scale marks, and a light-emitting element and a photoelectric conversion element that serve as a detecting unit. Such a photoelectric position detecting device uses a diffracted light, produced by emitting light generated by the light-emitting element to the optical grid scale mark, to convert the change in light intensity corresponding to the change in displacement into an electric signal by the photoelectric conversion element.

The specific embodiment described above mainly includes the disclosure including a configuration described below.

A position detecting device according to one aspect of the present disclosure is a position detecting device that detects a position of a slider that moves along a predetermined moving direction, the position detecting device including: a scale that is attached to the slider and includes a first track and a second track adjacent to each other along a direction perpendicular to the moving direction, the first track being composed of scale marks lined along the moving direction at a first interval, the second track being composed of scale marks lined along the moving direction at a second interval; a processing unit that detects the first track to generates first positional data corresponding to the first interval and detects the second track to generate second positional data corresponding to the second interval; and an information processing unit that recognizes the first positional data as positional information of the slider, generates identification information unique to the slider, and outputs the identification information, the identification information corresponding to a difference between the first positional data and the second positional data.

The position detecting device is such that the processing unit detects the first and second tracks to generate first positional data and second positional data. The information processing unit recognizes the first positional data as positional information of the slider, and generates identification information that corresponds to a difference between the first positional data and the second positional data and is unique to the slider. With such a configuration, the position of the slider can be identified based on the first positional data that the information processing unit recognizes as the positional information, and the slider to be moved can be identified based on the identification information generated by the signal comparison processing unit.

The position detecting device described above may be configured that the processing unit includes a first sensor that detects a displacement relative to the first track and outputs a first two-phase sinusoidal wave signal having a first wavelength corresponding to the first interval, a second sensor that detects a displacement relative to the second track and outputs a second two-phase sinusoidal wave signal having a second wavelength corresponding to the second interval, a first signal processing unit that performs predetermined first interpolation processing on the first two-phase sinusoidal wave signal, generates the first positional data, and outputs the first positional data, and a second signal processing unit that performs predetermined second interpolation processing on the second two-phase sinusoidal wave signal, generates the second positional data, and outputs the second positional data.

In such an aspect, the first and second sensors respectively detect displacements relative to the first and second tracks on the scale attached to the slider, and the first and second signal processing units respectively generate the first positional data and the second positional data based on the respective output signals from the first and second sensors. The processing unit functions in such a manner.

In the position detecting device, the first interpolation processing is generating the first positional data from the first two-phase sinusoidal wave signal, the first positional data corresponding to an accumulated value of a first count value related to a first resolution unit-length determined by dividing the first wavelength by a predetermined number, and the second interpolation processing is generating the second positional data from the second two-phase sinusoidal wave signal, the second positional data corresponding to an accumulated value of a second count value related to a second resolution unit-length determined by dividing the second wavelength by a predetermined number.

In this aspect, the first positional data, which is the positional information of the slider, corresponds to the accumulated value of the first count value. The second positional data used for generating the identification information of the slider corresponds to the accumulated value of the second count value.

In the position detecting device, the information processing unit determines the subtracted value as the identification information, the subtracted value being obtained by subtracting the second count value from the first count value.

In this aspect, the identification information of the slider is generated by a relatively simple manner, that is, by subtracting the second count value from the first count value.

In the position detecting device, the information processing unit determines a value as the identification information if the subtracted value is negative, the value being obtained by adding a maximum value of the first count value to the subtracted value.

In such an aspect, the identification information takes a constant value regardless of to which position on the first track on the scale the first positional data, which is the positional information of the slider corresponding to the accumulated value of the first count value, corresponds. In other words, the identification information takes a constant value regardless of in which position between both the end portions, regarding the slider moving direction, on the first track on the scale the detected position of the first sensor is.

Preferably, in the position detecting device, the scale is a magnetic scale, the first sensor and the second sensor are each a magnetic sensor, and a groove is provided on the scale between the first track and the second track and extends along the moving direction.

In such an aspect, the groove provided between the first track and the second track prevents magnetic interference that might occur when each of the first sensor and the second sensor, which are magnetic sensors, detect displacements relative to the first track and the second track on the scale from the magnetic field. Thus, detection accuracy of the first sensor and the second sensor can be improved.

A linear conveyor device according to another aspect of the present disclosure includes: a slider that has a linear motor mover and is configured to be movable in a predetermined moving direction; a linear motor stator that faces the linear motor mover of the slider and forms a linear motor in cooperation with the linear motor mover; and the position detecting device described above.

According to the linear conveyor device, the position detecting device for identifying the position of the slider that moves along the predetermined moving direction also identifies the slider to be moved, so that no mechanism for identifying the slider to be moved is necessary in addition to the position detecting device. Thus, the device can be configured simple.

As described above, the present disclosure can provide the position detecting device that identifies the slider to be moved and the position of the slider, and the linear conveyor device including the position detecting device.

What is claimed is:

1. A position detecting device that detects a position of a slider that moves along a predetermined moving direction, the position detecting device comprising:
   a scale that is attached to the slider and includes a first track and a second track adjacent to each other along a direction perpendicular to the moving direction, the first track being composed of scale marks lined along the moving direction at a first interval, the second track being composed of scale marks lined along the moving direction at a second interval;
   a processor configured to detect the first track to generates first positional data corresponding to the first interval and detect the second track to generate second positional data corresponding to the second interval; and
   an information processor configured to recognize the first positional data as positional information of the slider, generate identification information unique to the slider, and output the identification information, the identification information corresponding to a difference between the first positional data and the second positional data.

2. The position detecting device according to claim 1, wherein
   the position detecting device is included in a linear conveyor device comprising:
   a slider that has a linear motor mover and is configured to be movable in a predetermined moving direction;
   a linear motor stator that faces the linear motor mover of the slider and forms a linear motor in cooperation with the linear motor mover.

3. The position detecting device according to claim 1, wherein
   the processor includes
   a first sensor configured to detect a displacement relative to the first track and outputs a first two-phase sinusoidal wave signal having a first wavelength corresponding to the first interval,
   a second sensor configured to detect a displacement relative to the second track and outputs a second two-phase sinusoidal wave signal having a second wavelength corresponding to the second interval,
   a first signal processor configured to perform predetermined first interpolation processing on the first two-phase sinusoidal wave signal, generate the first positional data, and output the first positional data, and
   a second signal processor configured to perform predetermined second interpolation processing on the second two-phase sinusoidal wave signal, generate the second positional data, and output the second positional data.

4. The position detecting device according to claim 3, wherein
   the position detecting device is included in a linear conveyor device comprising:
   a slider that has a linear motor mover and is configured to be movable in a predetermined moving direction;
   a linear motor stator that faces the linear motor mover of the slider and forms a linear motor in cooperation with the linear motor mover.

5. The position detecting device according to claim 3, wherein
   the scale is a magnetic scale,
   the first sensor and the second sensor are each a magnetic sensor, and
   a groove is provided on the scale between the first track and the second track and extends along the moving direction.

6. The position detecting device according to claim 5, wherein
   the position detecting device is included in a linear conveyor device comprising:
   a slider that has a linear motor mover and is configured to be movable in a predetermined moving direction;
   a linear motor stator that faces the linear motor mover of the slider and forms a linear motor in cooperation with the linear motor mover.

7. The position detecting device according to claim 3, wherein
   the first interpolation processing is generating the first positional data from the first two-phase sinusoidal wave signal, the first positional data corresponding to an accumulated value of a first count value related to a first resolution unit-length determined by dividing the first wavelength by a predetermined number, and
   the second interpolation processing is generating the second positional data from the second two-phase sinusoidal wave signal, the second positional data corresponding to an accumulated value of a second count value related to a second resolution unit-length determined by dividing the second wavelength by a predetermined number.

8. The position detecting device according to claim 7, wherein
the position detecting device is included in a linear conveyor device comprising:
a slider that has a linear motor mover and is configured to be movable in a predetermined moving direction;
a linear motor stator that faces the linear motor mover of the slider and forms a linear motor in cooperation with the linear motor mover.

9. The position detecting device according to claim 7, wherein the information processor determines a subtracted value as the identification information, the subtracted value being obtained by subtracting the second count value from the first count value.

10. The position detecting device according to claim 9, wherein
the position detecting device is included in a linear conveyor device comprising:
a slider that has a linear motor mover and is configured to be movable in a predetermined moving direction;
a linear motor stator that faces the linear motor mover of the slider and forms a linear motor in cooperation with the linear motor mover.

11. The position detecting device according to claim 9, wherein the information processor determines a value as the identification information if the subtracted value is negative, the value being obtained by adding a maximum value of the first count value to the subtracted value.

12. The position detecting device according to claim 11, wherein
the position detecting device is included in a linear conveyor device comprising:
a slider that has a linear motor mover and is configured to be movable in a predetermined moving direction;
a linear motor stator that faces the linear motor mover of the slider and forms a linear motor in cooperation with the linear motor mover.

* * * * *